(12) United States Patent
Ninomiya et al.

(10) Patent No.: US 9,760,739 B2
(45) Date of Patent: *Sep. 12, 2017

(54) INFORMATION PROCESSING DEVICE

(71) Applicant: PANASONIC INTELLECTUAL PROPERTY MANAGEMENT CO., LTD., Osaka (JP)

(72) Inventors: Takeshi Ninomiya, Osaka (JP); Yoshihide Nakashima, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 32 days.

This patent is subject to a terminal disclaimer.

(21) Appl. No.: 14/816,473

(22) Filed: Aug. 3, 2015

(65) Prior Publication Data
US 2016/0042201 A1 Feb. 11, 2016

(30) Foreign Application Priority Data
Aug. 8, 2014 (JP) .................. 2014-162828

(51) Int. Cl.
*G06F 12/16* (2006.01)
*G06F 21/84* (2013.01)
(Continued)

(52) U.S. Cl.
CPC ............ *G06F 21/84* (2013.01); *G06F 3/0416* (2013.01); *G06F 3/0488* (2013.01); *G06F 21/57* (2013.01);
(Continued)

(58) Field of Classification Search
USPC ............................................... 726/26; 345/87
See application file for complete search history.

(56) References Cited

U.S. PATENT DOCUMENTS 5,297,202 A * 3/1994 Kapp ................. G06Q 20/0453
235/379
5,491,507 A 2/1996 Umezawa et al.
(Continued)

FOREIGN PATENT DOCUMENTS

| JP | 6-141306 | 5/1994 |
| JP | 2001-256409 | 9/2001 |

(Continued)

*Primary Examiner* — Amare F Tabor
(74) *Attorney, Agent, or Firm* — Greenblum & Bernstein, P.L.C.

(57) ABSTRACT

A non-secure display area and a secure display area are set on a screen of a display section of a touch panel TP. A non-secure input area and a secure input area are set on a detection surface of a touch input detector of the touch panel TP. In settlement processing, in a display area where the non-secure display area and the secure display area are overlapped, amount information is displayed. A message for urging authentication information input and a PIN pad are displayed in the secure display area. An operator can safely input PIN information to secure the input area through the PIN pad displayed in the secure display area. Even when the secure portion and the non-secure portion are present together, the settlement terminal device can secure the security of input authentication information or the like to suppress the operator's mistake or incorrect operation.

10 Claims, 12 Drawing Sheets

(51) Int. Cl.
    *G06F 21/60*     (2013.01)
    *G06F 3/041*     (2006.01)
    *G06F 21/57*     (2013.01)
    *G06F 21/82*     (2013.01)
    *G06F 3/0488*     (2013.01)

(52) U.S. Cl.
    CPC .............. *G06F 21/60* (2013.01); *G06F 21/82* (2013.01); *G06F 2221/031* (2013.01); *G09G 2300/02* (2013.01); *G09G 2358/00* (2013.01)

(56) References Cited

U.S. PATENT DOCUMENTS

| | | | | |
|---|---|---|---|---|
| 5,768,386 | A * | 6/1998 | Yokomoto | G06F 21/83 345/173 |
| 5,970,146 | A | 10/1999 | McCall et al. | |
| 6,317,835 | B1 * | 11/2001 | Bilger | G06F 21/83 380/52 |
| 6,367,015 | B1 * | 4/2002 | Kubo | G06F 3/0488 345/173 |
| 6,630,928 | B1 * | 10/2003 | McIntyre | G06F 3/04886 345/173 |
| 7,574,739 | B2 * | 8/2009 | Shirakawa | G06F 21/36 713/170 |
| 8,261,064 | B2 * | 9/2012 | Ditzman | G06F 21/83 178/18.01 |
| 8,341,642 | B2 * | 12/2012 | Aizawa | G06Q 20/0655 235/380 |
| 8,788,428 | B2 * | 7/2014 | Weston | G06F 21/554 705/64 |
| 8,832,426 | B2 * | 9/2014 | Moon | G06F 3/0416 345/156 |
| 9,264,694 | B2 * | 2/2016 | Kuwahara | G03B 29/00 |
| 2003/0132292 | A1 | 7/2003 | Gomez et al. | |
| 2004/0024710 | A1 | 2/2004 | Fernando et al. | |
| 2004/0167820 | A1 | 8/2004 | Melick et al. | |
| 2005/0222958 | A1 | 10/2005 | Hasegawa et al. | |
| 2010/0145854 | A1 | 6/2010 | Messerges et al. | |
| 2011/0138464 | A1 * | 6/2011 | Ohta | G06F 21/74 726/22 |
| 2013/0275306 | A1 * | 10/2013 | Ignatchenko | G06Q 20/3825 705/44 |
| 2014/0052607 | A1 * | 2/2014 | Park | G06Q 40/025 705/38 |
| 2014/0195429 | A1 * | 7/2014 | Paulsen | G06Q 20/382 705/44 |
| 2015/0254667 | A1 | 9/2015 | Ninomiya | |

FOREIGN PATENT DOCUMENTS

| | | |
|---|---|---|
| JP | 2004-355211 | 12/2004 |
| JP | 2005-293058 | 10/2005 |
| JP | 2006-195599 | 7/2006 |
| JP | 2011-138477 | 7/2011 |
| WO | 2011/051757 | 5/2011 |

* cited by examiner

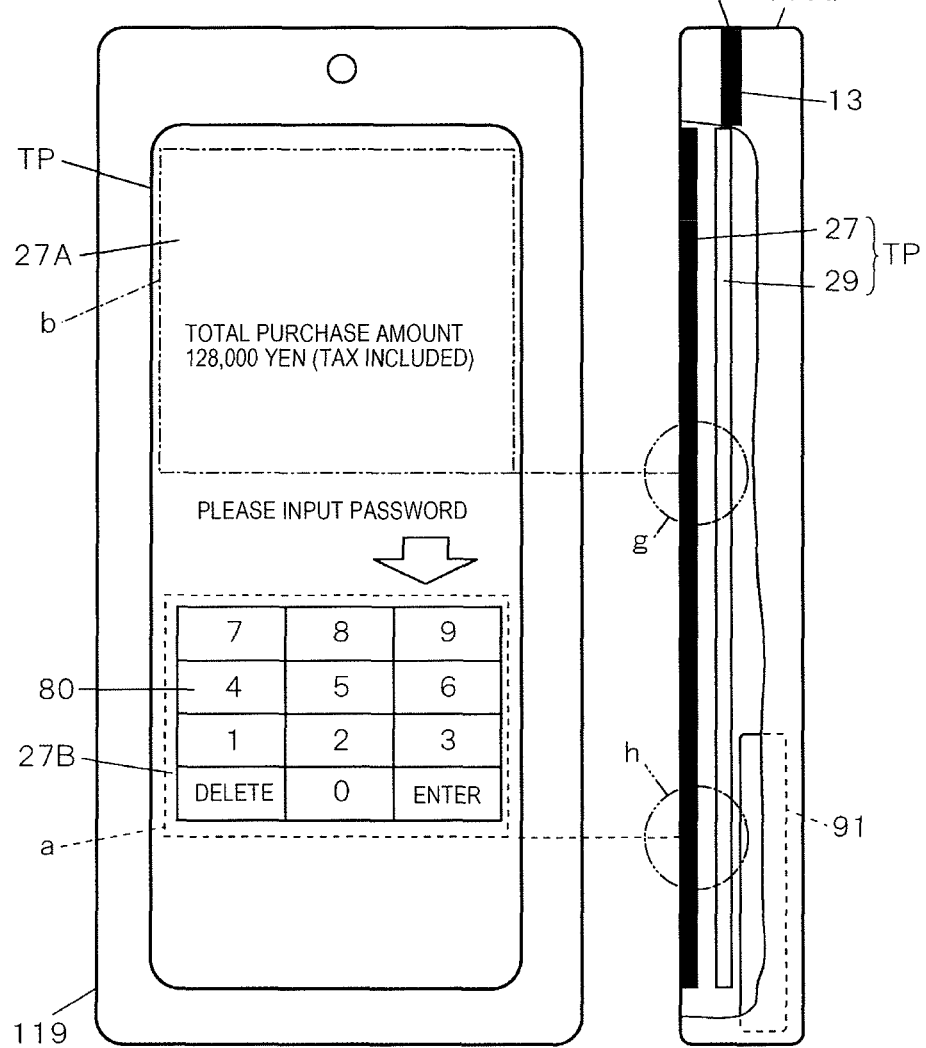
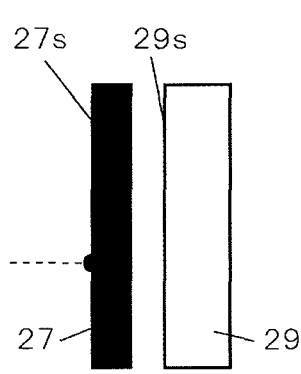
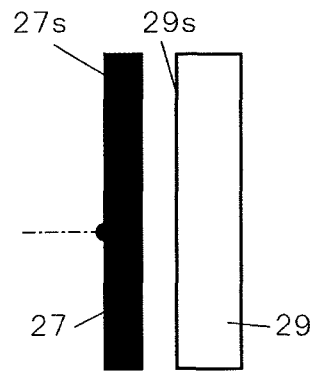

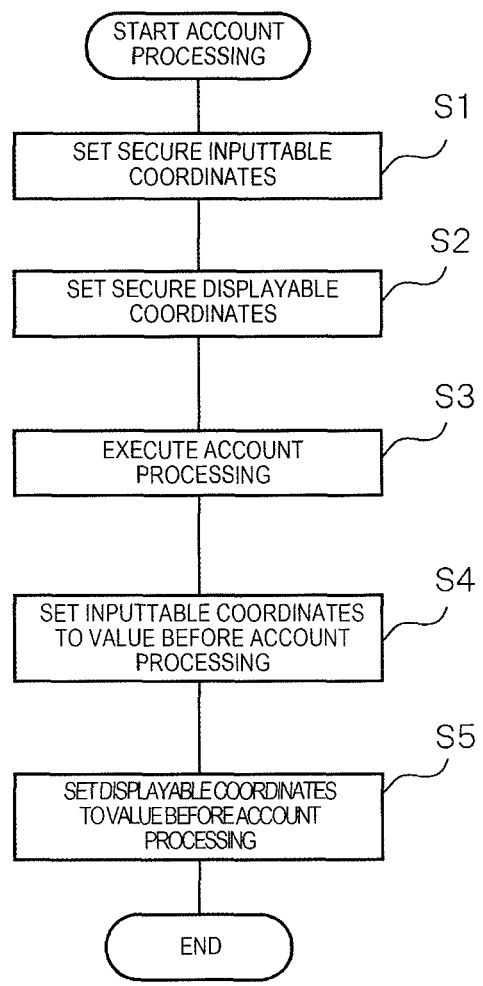

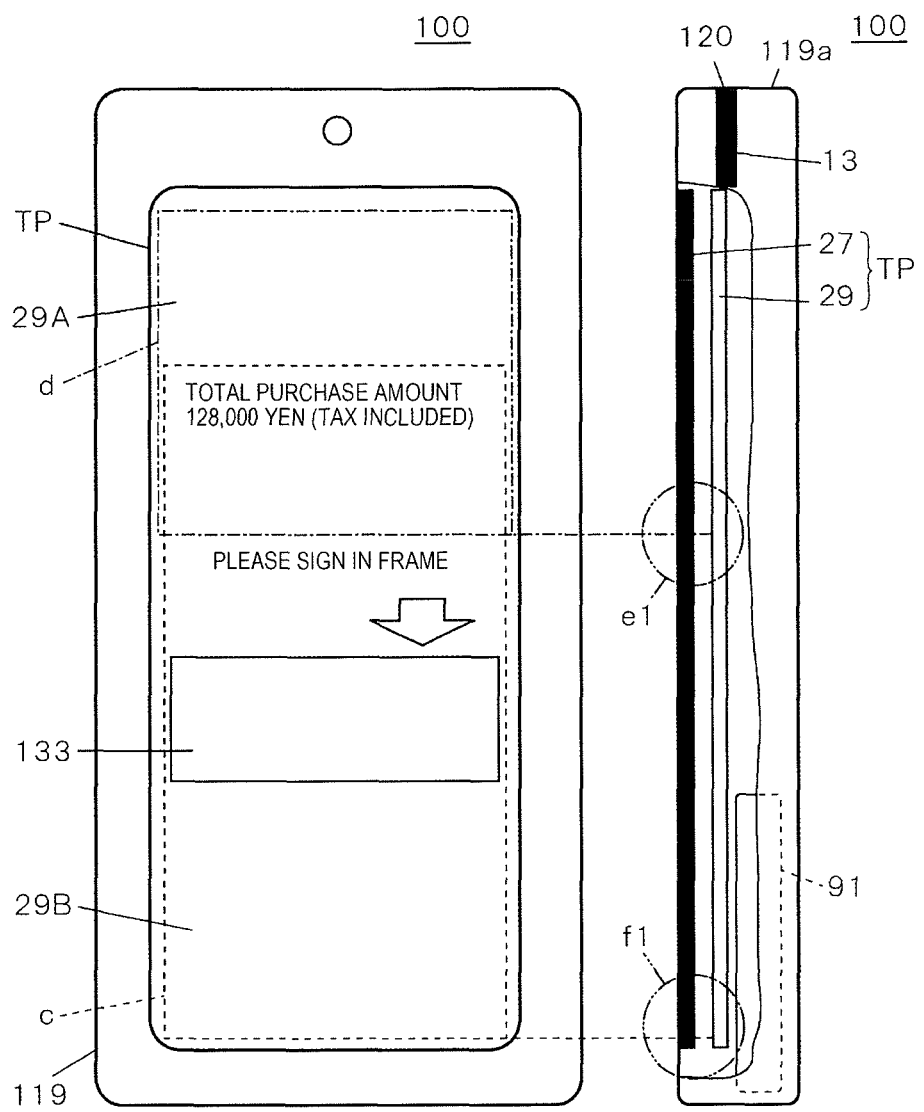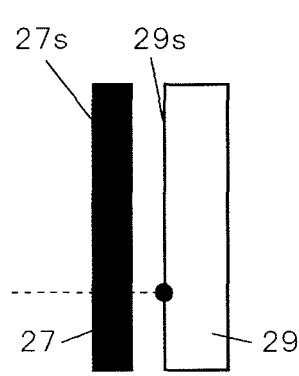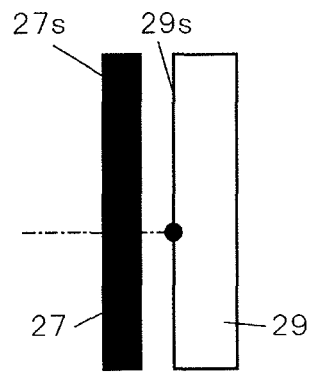

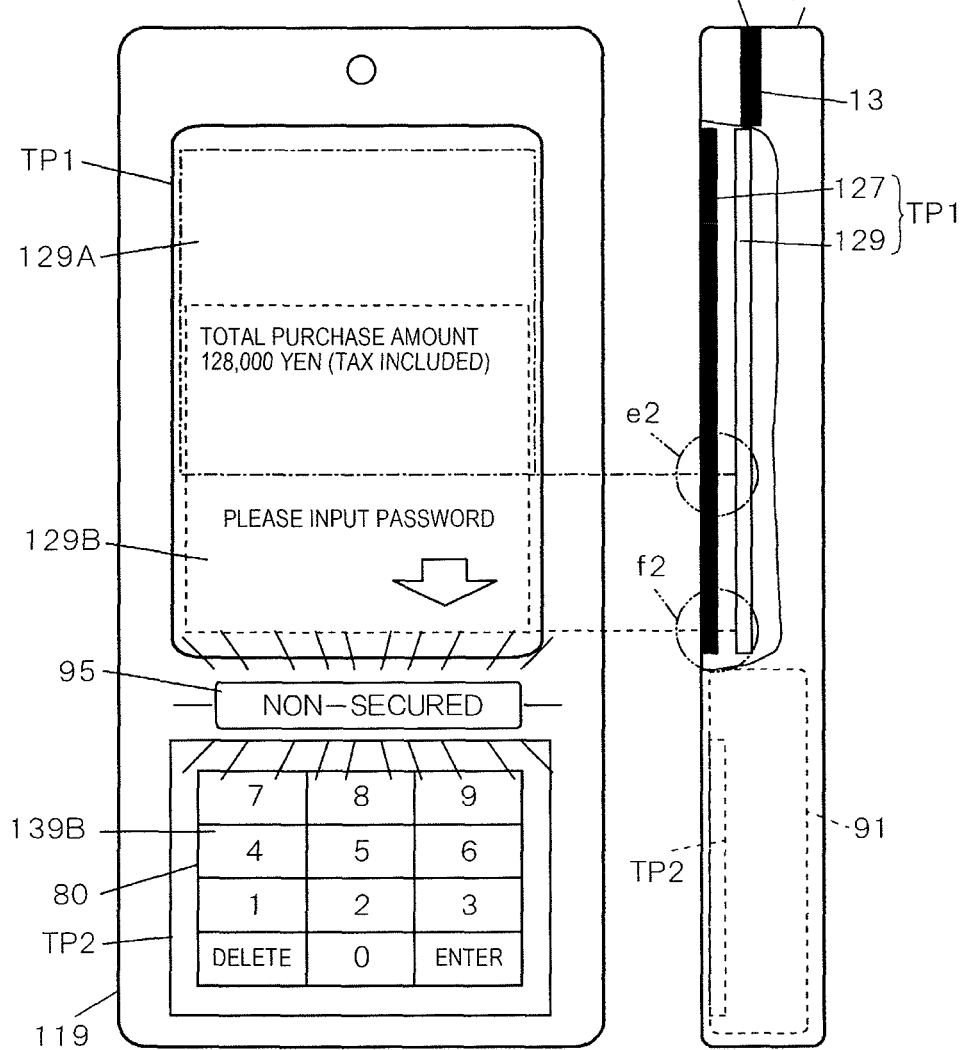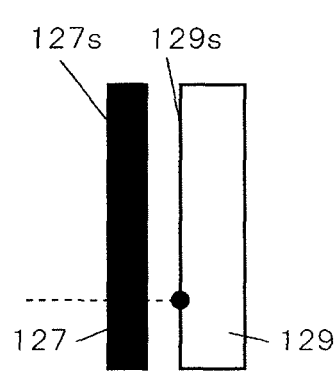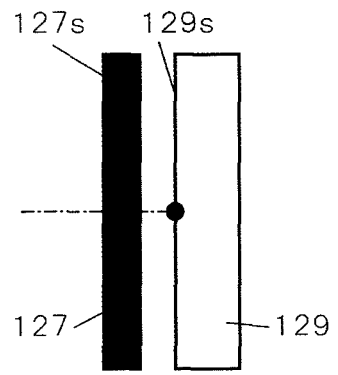

INFORMATION PROCESSING DEVICE

BACKGROUND OF THE INVENTION

1. Field of the Invention

The present invention relates to an information processing device that performs a variety of processing used for a procedure of settlement processing in transactions.

2. Description of the Related Art

For example, in a (credit) transaction of goods or services using a credit card, security of the transaction is secured by checking (identity verification) whether a person who performs the transaction is identical to an owner of the credit card used in the transaction. The identity verification is performed as a customer signs a transaction slip where transaction content is printed in settlement processing of the transaction, and a clerk visually compares the customer signature with a signature written on the credit card.

In recent years, a terminal device where such signature input and display can be performed is realized using a smart phone or a tablet terminal. Numerous smart phones or tablet terminals are distributed as consumer products, which enable building of a settlement terminal device provided inexpensively. That is, if such settlement terminal devices can be configured using numerous information terminals that are distributed as the consumer products such as smart phones or tablet terminals, it is possible to provide the settlement terminal devices inexpensively. Further, since generalization of development platforms of applications (software) used in the settlement processing and other work is available, it is easy to reuse or divert development resources.

However, an information terminal designed to be used as a consumer products does not have "tamper resistance" necessary for protecting customer information to safely performing the transaction. The "tamper resistance" refers to resistance against an attack of trying to steal information from the information terminal. In order to secure the tamper resistance as a countermeasure against the attack of trying to steal the information from the information terminal, in an information processing device disclosed in US Patent Unexamined Publication No. 2010/0145854 or Japanese Patent Unexamined Publication No. 2004-355211, a portion relating to authentication information on a card used in settlement processing ("secure portion" is a portion having necessary tamper resistance as a settlement terminal device) is separated from a generic portion.

However, in the above-mentioned information processing device, the security is secured in the secure portion, but is generally insufficient in a non-secure portion. Thus, when an unauthorized application is installed in the non-secure portion, there is a possibility that a formal input area where authentication information for identity verification (for example, personal identification number (PIN) or signature) is input is illegally hidden. Further, there is a possibility that another unauthorized input area is displayed by the unauthorized application. In these situations, when a user mistakenly considers the unauthorized input area as a formal input area to input authentication information in the unauthorized input area, there is a possibility that phishing of the authentication information occurs.

SUMMARY OF THE INVENTION

An information processing device of the present disclosure secures security of input authentication information or the like to suppress an operator's mistakes or incorrect operation even when a secure portion and a non-secure portion are present together.

According to an aspect of the present disclosure, there is provided an information processing device that performs a variety of processing of the present disclosure including: a display section that displays information in the variety of processing on a screen; an input detector that detects an input operation with respect to a predetermined input detection surface; and an area setting unit that sets a secure area having tamper resistance against information displayed on the screen or tamper resistance against an input operation to be input to the input detection surface in at least one of the screen and the input detection surface.

According to this configuration, the area setting unit sets the secure area in at least one of the screen of the display section and the input detection surface of the input detector. Even when a secure portion and a non-secure portion are present together, when performing authentication processing or the like, the information processing device uses the secure area to secure security of the authentication processing or the like, and to suppress an operator's mistakes or incorrect operation.

For example, since an unauthorized application is not installed in the secure portion, it is possible to prevent reception of an input detected in the secure area, and to prevent display of information in the secure area. Accordingly, the information processing device can reduce loss generated when the unauthorized application acquires a certificate without permission and performs unauthorized behavior like a formal application, for example, theft or falsification of a PIN or a signature, an unauthorized transaction, or the like.

Further, by displaying information in the secure display area, the information processing device can inform the operator that the area is an area where the safety of input of authentication information or the like is guaranteed, and the operator can easily recognize that the area is an input area where the security is guaranteed, and can safely input authentication information or the like for the transaction. Accordingly, the information processing device can safely process the authentication information or the like.

BRIEF DESCRIPTION OF DRAWINGS

FIG. 2A is a front view and a side sectional view of a settlement terminal device indicating an inputtable area according to the first exemplary embodiment;

FIG. 2B is an enlarged view of a portion surrounded by double dot chain line frame g shown in FIG. 2A;

FIG. 2C is an enlarged view of a portion surrounded by double dot chain line frame h shown in FIG. 2A;

FIG. 6 is a flowchart illustrating a settlement processing procedure in the settlement terminal device of the present exemplary embodiment;

FIG. 7A is a front view and a side view of a settlement terminal device indicating a displayable area according to a modification example of the first exemplary embodiment;

FIG. 7B is an enlarged view of a portion surrounded by double dot chain line frame e1 shown in FIG. 7A;

FIG. 7C is an enlarged view of a portion surrounded by double dot chain line frame f1 shown in FIG. 7A;

FIG. 9A is a front view and a side view of a settlement terminal device indicating a displayable area according to a second exemplary embodiment;

FIG. 9B is an enlarged view of a portion surrounded by double dot chain line frame e2 shown in FIG. 9A;

FIG. 9C is an enlarged view of a portion surrounded by double dot chain line frame f2 shown in FIG. 9A;

DETAILED DESCRIPTION OF THE PREFERRED EMBODIMENTS

Hereinafter, exemplary embodiments of the invention will be described with reference to the accompanying drawings. In the following exemplary embodiments, as an example of an information processing device according to the invention, a settlement terminal device used in settlement processing in transactions of goods or services will be described.

First Exemplary Embodiment

Figure 3:
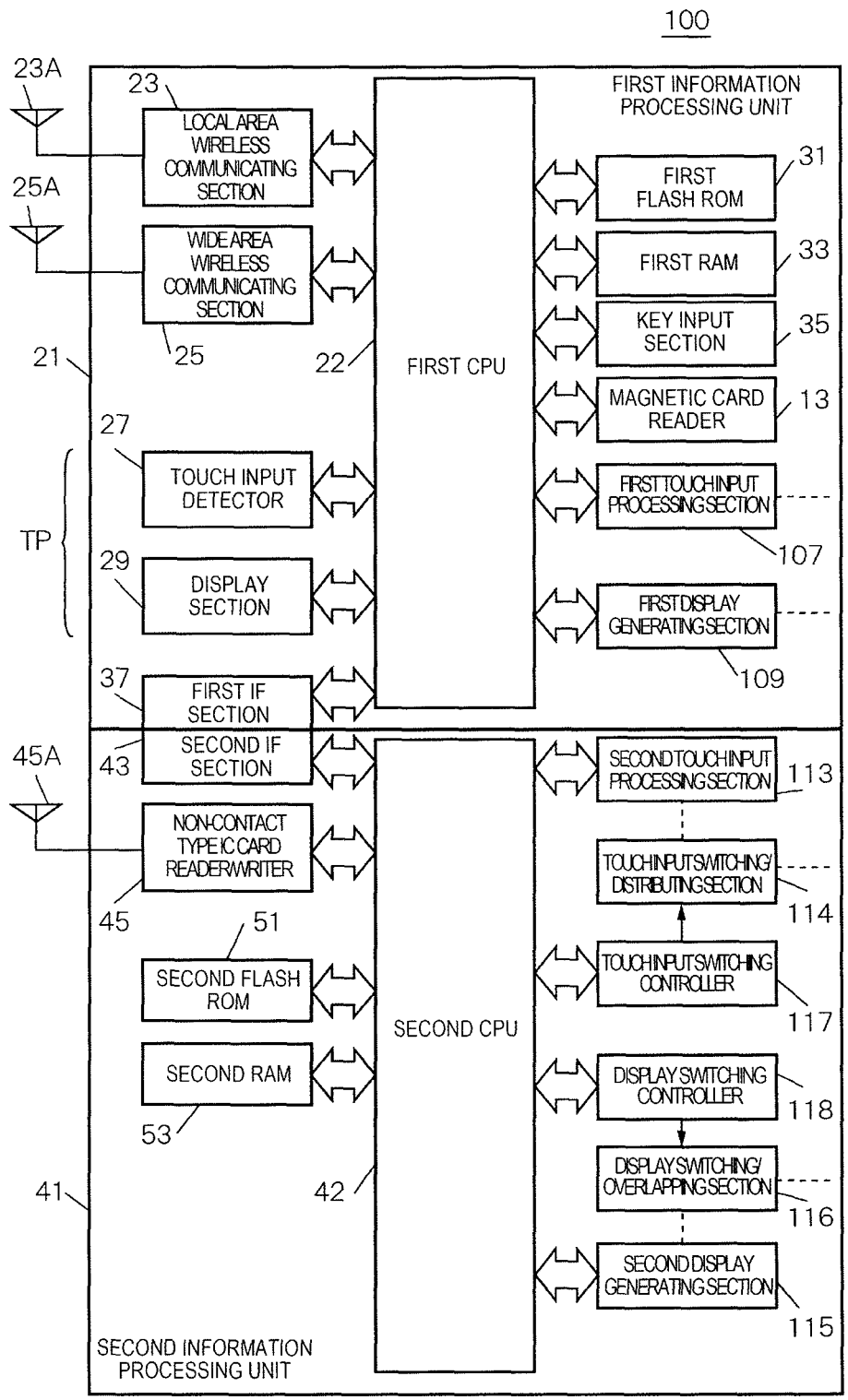
FIG. 3 is a block diagram illustrating an example of a hardware configuration of the settlement terminal device according to the first exemplary embodiment.

Settlement terminal device 100 of a first exemplary embodiment is a portable type, and for example, includes first information processing unit 21 and second information processing unit 41 that perform a variety of information processing including settlement processing in transactions of goods or services (see FIG. 3).

Figure 1A:
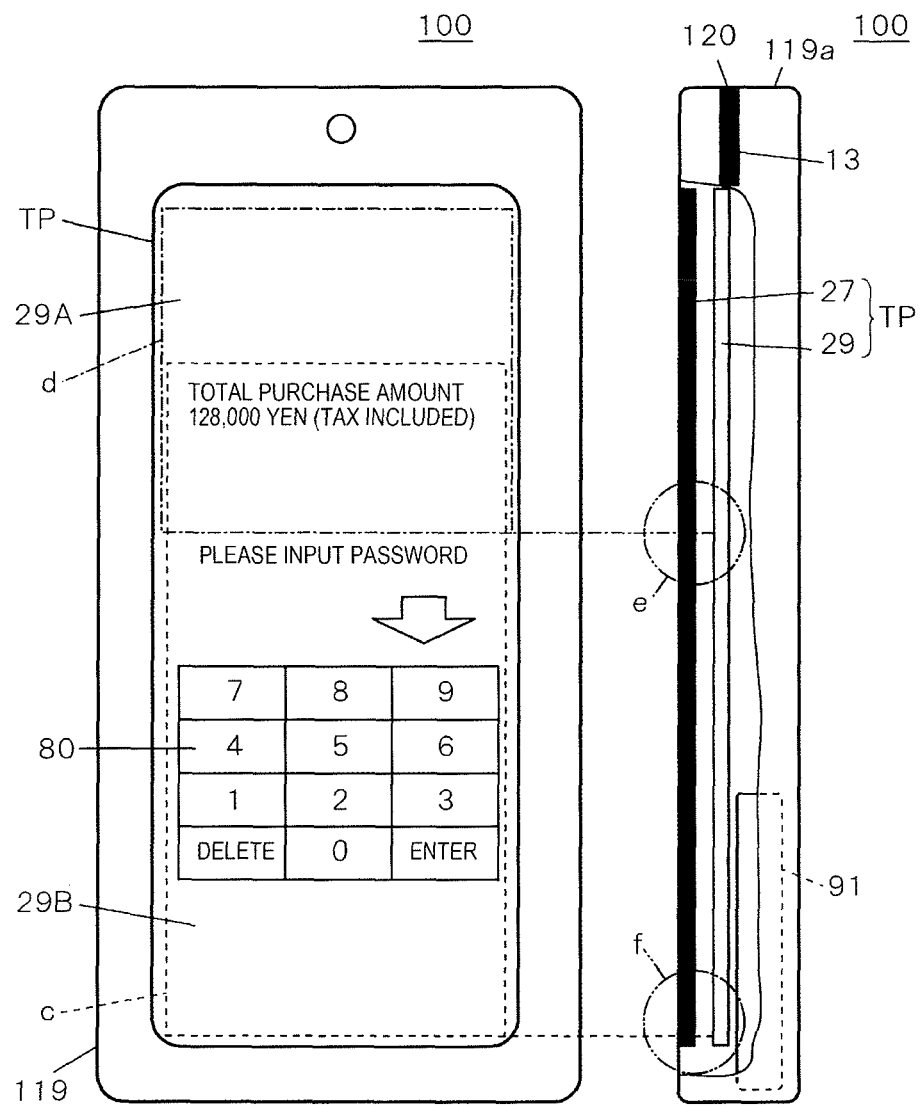
FIG. 1A is a front view and a side sectional view of a settlement terminal device indicating a displayable area according to a first exemplary embodiment.
Figure 1C:
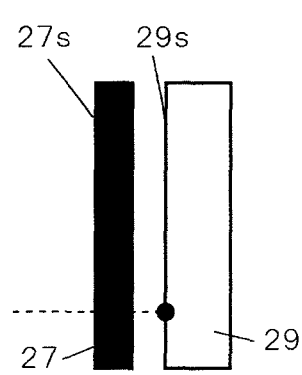
FIG. 1C is an enlarged view of a portion surrounded by double dot chain line frame f shown in FIG. 1A.
Figure 1B:
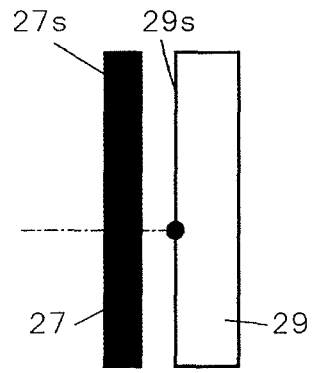
FIG. 1B is an enlarged view of a portion surrounded by double dot chain line frame e shown in FIG. 1A.

FIG. 1A is a front view and a side sectional view of settlement terminal device 100 indicating a displayable area according to the first exemplary embodiment. FIG. 1B is an enlarged view of a portion surrounded by double dot chain line frame e shown in FIG. 1A. FIG. 1C is an enlarged view of a portion surrounded by double dot chain line frame f shown in FIG. 1A. Touch panel TP is provided on an operational surface of housing 119 of settlement terminal device 100. On screen 29s of display section 29 that forms touch panel TP, secure display area 29B (see a broken line shown in FIG. 1A) defined by display coordinates where an acquirer work application or a settlement processor work application (hereinafter, referred to as an "acquirer work application") can perform secure display, for example, and non-secure display area 29A (see a single dot chain line shown in FIG. 1A) defined by display coordinates where a member store work application can perform non-secure display, for example, are set. That is, on screen 29s of display section 29, display area 29B indicating a range of coordinates where the secure display can be performed, and display area 29A indicating a range of coordinates where the non-secure display can be performed are set for each processing content of an application used in settlement terminal device 100. Thus, settlement terminal device 100 is able to secure reliability of content displayed in secure display area 29B and security of content input to secure input area 27B, whenever the application (for example, the above-mentioned acquirer work application or the member store work application) is used, and is able to call operator's attention to safety of information which is handled.

The acquirer refers to a company that collects member contracts dealing with transactions using a specific credit card and sums up credit sales, and the acquirer work application refers to a work application used between a member store and the acquirer or a settlement processor. Further, the settlement processor refers to a company that executes settlement for the acquirer based on consignment from the acquirer. The member store work application refers to an application used for internal work of the member store.

FIG. 2A is a front view and a side sectional view of settlement terminal device 100 indicating an inputtable area according to the first exemplary embodiment. FIG. 2B is an enlarged view of a portion surrounded by double dot chain line frame g shown in FIG. 2A. FIG. 2C is an enlarged view surrounded by double dot chain line frame h shown in FIG. 2A. On detection surface 27s which is an example of an input detection surface of touch input detector 27 that forms touch panel TP, secure input area 27B (that is, a range of coordinates where secure input can be performed; see a broken line shown in FIG. 2A), and non-secure input area 27A (that is, a range of coordinates where non-secure input can be performed; see a single dot chain line shown in FIG. 2A) are set.

As described above, touch panel TP is provided on the operation surface of housing 119, and has a structure in which touch input detector (touch pad) 27 and display section (liquid crystal display (LCD)) 29 are overlapped. First information processing unit 21 that includes touch panel TP and secure second information processing unit 41 are accommodated in housing 119.

Here, "secure" means that tamper resistance is provided. "Tamper" means unauthorized analysis or modification of software or hardware in an information processing device (for example, settlement terminal device 100), unauthorized deprivation, modification, or disabling attack of internal information of the information processing device (for example, settlement terminal device 100). Accordingly, the "tamper resistance" means resistance against such an attack. With the tamper resistance, for example, it is possible to protect customer information in the settlement processing, and to safely perform the transaction.

First information processing unit 21 may be configured as "secure", or may be configured as "non-secure". The "non-secure" means that the tamper resistance is not provided or the tamper resistance is low. Secure second information processing unit 41 is built in secure module 91 in housing 119.

Settlement terminal device 100 includes magnetic card reader 13 disposed in an end portion of housing 119. Magnetic card reader 13 includes slit 120 provided on front surface 119a of housing 119. Slit 120 refers to a path through which a magnetic card is slid (swiped) in order to read information (magnetic stripe) of the magnetic card. Slit 120 may be provided on a rear surface (surface opposite to front surface 119a) of housing 119.

Display section 29 displays a variety of information on screen 29s. As shown in FIG. 1, non-secure display area 29A (the range of the coordinates where the non-secure display can be performed; see the single dot chain line shown in FIG. 1A) where non-secure information is displayed, and secure display area 29B (the range of the coordinates where the secure display can be performed; see the broken line shown in FIG. 1A) are set on screen 29s. Non-secure display area 29A is an area which is accessible by the member store work application dealing with amount information or the like. Further, the secure display area is an area which is accessible by the acquirer work application dealing with authentication information or the like.

Non-secure display area 29A is set in a range of about ⅓ in an upper part of screen 29s, for example. Further, secure display area 29B is set in a range of about ¾ from a lower part of screen 29s to the upper part thereof. Accordingly, an area where non-secure display area 29A and secure display area 29B are overlapped is set in an approximately central part of screen 29s. Here, information on settlement amount, for example, "total purchase amount 128,000 Yen (tax included)" is displayed in the overlap area.

Further, as shown in FIGS. 2B and 2C, touch input detector 27 detects an input operation of pen input or the like with respect to detection surface 27s. Non-secure input area 27A (see the single dot chain line shown in FIG. 2A) for detection of an input of non-secure information and secure input area 27B (see the broken line shown in FIG. 2A) for detection of an input of secure information are set on detection surface 27s. Non-secure input area 27A is an area which is accessible by the member store work application dealing with amount information or the like. Further, secure input area 27B is an area which is accessible by the acquirer work application dealing with authentication information or the like. Non-secure input area 27A is set in a range of about ⅓ in an upper part of detection surface 27s. Further, secure input area 27B is set in a range of about ⅓ from a central part of detection surface 27s to a lower part thereof. On detection surface 27s, non-secure input area 27A and secure input area 27B are not overlapped. Accordingly, secure information cannot be input-processed as non-secure information, and thus, security is secured.

In this way, as the ranges of the coordinates of non-secure display area 29A and non-secure input area 27A are set to be different from each other with respect to the non-secure display and input to touch panel TP, settlement terminal device 100 can display amount information in non-secure display area 29A as non-secure information, and can receive an amount input from non-secure input area 27A, for example.

Further, as the ranges of the coordinates of secure display area 29B and secure input area 27B are set to be different from each other with respect to the secure display and input to touch panel TP, settlement terminal device 100 can display a PIN input screen (PIN pad 80) which is secure information in secure display area 29B, and can receive a PIN input from secure input area 27B.

As shown in FIGS. 1A and 2A, coordinates for setting an outer frame of non-secure input area 27A and coordinates for setting an outer frame of non-secure display area 29A may be different from each other. Further, coordinates for setting an outer frame of secure input area 27B and coordinates for setting an outer frame of secure display area 29B may be different from each other. In addition, outer frame shapes of non-secure input area 27A, secure input area 27B, non-secure display area 29A, and secure display area 29B may be arbitrary shapes other than the rectangular shapes shown in FIGS. 1A and 2A.

FIG. 3 is a block diagram illustrating an example of a hardware configuration of settlement terminal device 100 according to the first exemplary embodiment. Settlement terminal device 100 includes first information processing unit 21 and secure second information processing unit 41, as described above. First information processing unit 21 includes first central processing unit (CPU) C1, local area wireless communicating section 23, wide area wireless communicating section 25, display section 29, and touch input detector 27.

Further, first information processing unit 21 includes first flash read only memory (ROM) 31, first random access memory (RAM) 33, key input section 35, magnetic card reader 13, and first interface (IF) unit 37.

Further, first information processing unit 21 includes first touch input processing section 107 and first display generating section 109.

In first information processing unit 21, the respective units are connected to first CPU 22. First CPU 22 generally controls the entirety of first information processing unit 21, and for example, performs a variety of controls, processing, setting, determination, decision, confirmation, or the like.

Local area wireless communicating section 23 is connected to local area wireless communication antenna 23A, and for example, has a function of performing communication on a wireless LAN, using a local area wireless communication channel (not shown). Local area wireless communicating section 23 may perform communication (for example, Bluetooth (registered trademark) communication) other than wireless LAN communication.

Wide area wireless communicating section 25 is connected to wide area wireless communication antenna 25A, and has a function of performing communication through a wide area wireless communication channel (for example, wide area network (WAN)) (not shown). Communication on the wide area wireless communication channel may be performed using mobile communication such as wideband code division multiple access (W-CDMA), universal mobile telecommunications system (UMTS), code division multiple access (CDMA) 2000 or long term evolution (LTE), for example.

Display section 29 has a function of controlling display of touch panel TP (see FIGS. 1A and 2A). Touch input detector 27 has a function of detecting touch input to touch panel TP.

First flash ROM 31 has a function of storing a variety of data. In first flash ROM 31, various applications such as the member store work application or the acquirer work application are stored to be updated as necessary. Further, a program for controlling first information processing unit 21 is stored in first flash ROM 31.

First RAM 33 is a memory used for temporarily storing, when operation processing due to an operation of first information processing unit 21 is performed, for example, processing data generated in the middle of the operation processing.

Key input section 35 has a function of receiving an input through input keys (not shown) disposed on a side surface or the like of housing 119. A part of magnetic card reader 13 is disposed in slit 120, and has a function of reading a magnetic stripe of a magnetic card.

First touch input processing section 107 performs processing corresponding to an operation (pen input or the like) input to non-secure input area 27A. First display generating section 109 generates image data to be displayed in non-secure display area 29A.

First information processing unit 21 and second information processing unit 41 are connected to each other through first interface unit (hereinafter, referred to as first IF section) 37 and second interface unit (hereinafter, referred to as second IF section) 43, and perform exchange of a variety of data or commands. Further, first IF section 37 and second IF section 43 may be integrally formed.

Second information processing unit 41 includes second IF section 43, second CPU 42, non-contact type IC card reader/writer 45, second flash ROM 51, second RAM 53, second touch input processing section 113, touch input switching/distributing section 114, display switching/overlapping section 116, touch input switching controller 117, display switching controller 118, and second display generating section 115.

In second information processing unit 41, the respective units are connected to second CPU 42. Second CPU 42 generally controls the entirety of second information processing unit 41, and for example, performs a variety of controls, processing (for example, settlement processing), setting, determination, decision, confirmation, authentication, collation (for example, collation of a PIN or a signature), or the like.

Second flash ROM 51 has a function of storing a variety of data. Further, a program for controlling second information processing unit 41, in addition to the variety of data, is stored in second flash ROM 51.

Second RAM 53 is a memory used for temporarily storing, when operation processing due to an operation of second information processing unit 41 is performed, for example, processing data generated in the middle of the operation processing.

Non-contact type IC card reader/writer 45 includes loop antenna 45A, and is provided in second information processing unit 41 which is a secure side, to control input and output of an IC card. Non-contact type IC card reader/writer 45 and loop antenna 45A may be provided in first information processing unit 21.

Touch input switching controller 117 (area setting unit) sets each range of coordinates where each input operation to non-secure input area 27A and secure input area 27B can be received on detection surface 27s of touch input detector 27, and gives a switching/distribution instruction to touch input switching/distributing section 114. Touch input switching/distributing section 114 switches an output destination detected by touch input detector 27 to first touch input processing section 107 or second touch input processing section 113 according to the switching/distribution instruction.

Display switching controller 118 (area setting unit) sets each range of coordinates where each display to non-secure display area 29A and secure display area 29B can be performed on screen 29s of display section 29, and gives a switching/overlapping instruction to display switching/overlapping section 116. Display switching/overlapping section 116 switches a display destination of image data generated by first display generating section 109 or second display generating section 115 to coordinates of any one of non-secure display area 29A, secure display area 29B, and the overlap area according to the switching/overlapping instruction.

Second touch input processing section 113 performs processing corresponding to an operation (pen input or the like) input to secure input area 27B. Second display generating section 115 generates image data to be displayed in secure display area 29B.

Figure 4:
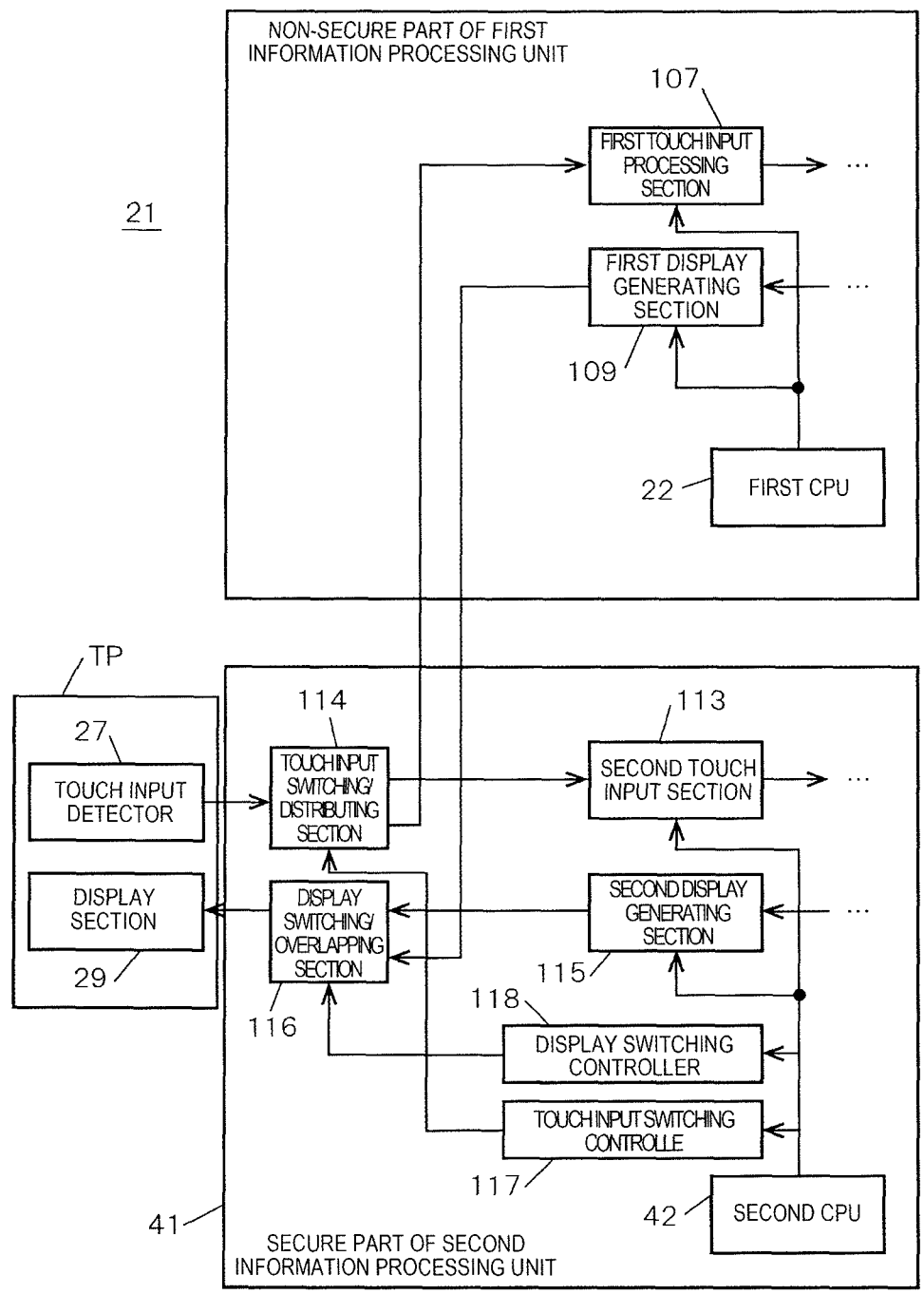
FIG. 4 is a block diagram illustrating configurations of portions relating to a display and input control with respect to a touch panel in a first information processing unit and a second information processing unit.
Figure 5A:
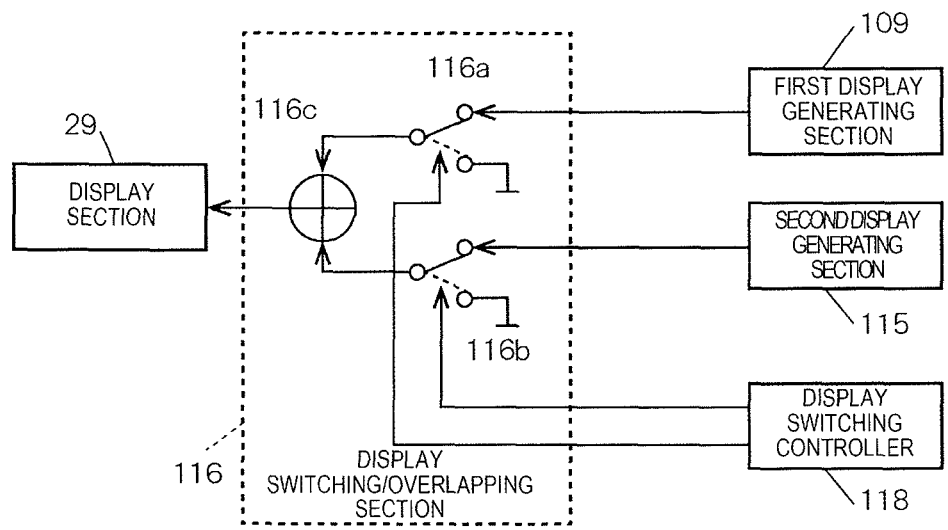
FIG. 5A is a circuit diagram illustrating a configuration of a display switching/overlapping section.
Figure 5B:
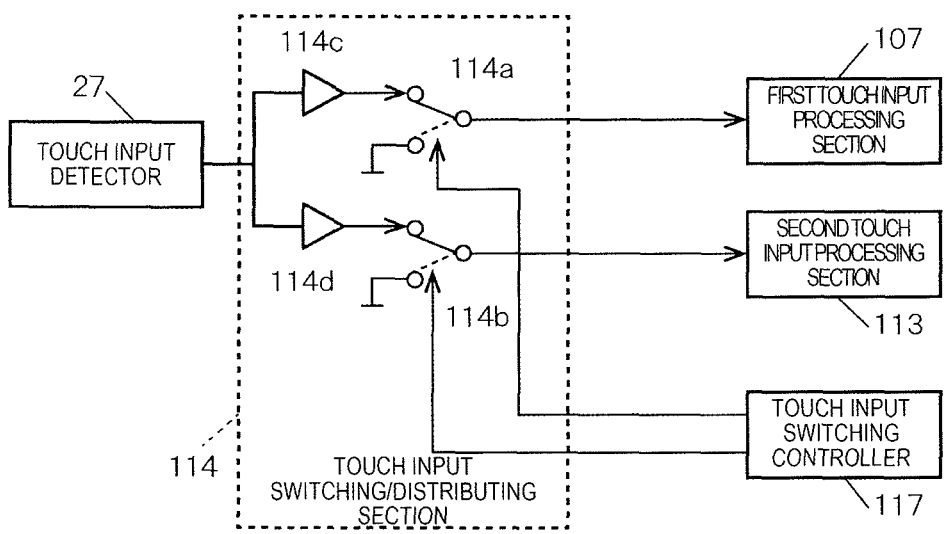
FIG. 5B is a circuit diagram illustrating a configuration of a touch input switching/distributing section.

FIG. 4 is a block diagram illustrating configurations of portions relating to a display and input control with respect to touch panel TP in first information processing unit 21 and second information processing unit 41. FIG. 5A is a circuit diagram illustrating a configuration of display switching/overlapping section 116. FIG. 5B is a circuit diagram illustrating a configuration of touch input switching/distributing section 114.

As shown in FIG. 4, display switching controller 118 and display switching/overlapping section 116 are provided in secure second information processing unit 41. Display information from first display generating section 109 in non-secure first information processing unit 21 and display information from second display generating section 115 in secure second information processing unit 41 are respectively input to display switching/overlapping section 116. The display information from first display generating section 109 and second display generating section 115 is input in a pixel unit, or in the unit of adjacent pixels of a minimum unit number corresponding to resolution of the touch panel, for example.

In FIG. 5A, when a display timing of display section 29 is associated with pixels in non-secure display area 29A (see FIG. 1A), display switching controller 118 turns on switch 116a, and turns off switch 116b. As a result, the display information from first display generating section 109 is input to display section 29 through switch 116a and adder 116c. Display section 29 displays the display information from first display generating section 109.

When the display timing of display section 29 is associated with pixels in secure display area 29B (see FIG. 1A), display switching controller 118 turns on switch 116b in display switching/overlapping section 116, and turns off switch 116a. As a result, the display information from secure second display generating section 115 is input to display section 29 through switch 116b and adder 116c. Display section 29 displays the display information from second display generating section 115. In settlement terminal device 100 of the present embodiment, PIN pad 80 (see FIGS. 1A and 2A) is displayed in secure display area 29B, for example.

When the display timing of display section 29 is associated with pixels in the area where non-secure display area 29A and secure display area 29B (see FIG. 1A) are overlapped, display switching controller 118 turns on both of switches 116a and 116b in display switching/overlapping section 116. As a result, the display information from non-secure first display generating section 109 and the display information from secure second display generating section 115 are overlapped by adder 116c, to then be input to display section 29. In settlement terminal device 100 of the present embodiment, for example, information on settlement amount ("total purchase amount 128,000 Yen (tax included)") is displayed in the overlap area. The information on the settlement amount in settlement terminal device 100 of the present embodiment is output from non-secure first display generating section 109. That is, in the settlement processing, the information output from secure second display generating section 115 is displayed, and in other processing (for example, work processing or generic application (e-mail, browser or the like)), the information output from non-secure first display generating section 109 is displayed. Accordingly, settlement terminal device 100 may efficiently use display section 29 of which the display area is limited.

Further, when the display timing of display section 29 is associated with pixels that do not belong to any one of non-secure display area 29A and secure display area 29B (see FIGS. 1A to 1C), switching controller 118 turns off both of switches 116a and 116b in display switching/overlapping section 116.

As described above, second information processing unit 41 is built in secure module 91 (see FIGS. 1A and 2A). Secure module 91 has the tamper resistance to prevent unauthorized confidential data reading. For example, secure module 91 enhances confidentiality so that reading is not easily performed from the outside. For example, secure module 91 includes a mechanism that detects whether physical confinement is broken. Accordingly, display switching controller 118 and display switching/overlapping section 116 in secure second information processing unit 41 do not undergo unauthorized access or unauthorized control from the outside. As a result, particularly, the display information to secure display area 29B (see FIGS. 2A to 2C) is not falsified. For example, the PIN pad displayed in secure display area 29B (see FIGS. 1A to 1C) or a message such as "Please input password" is displayed in secure display area 29B of display section 29 without being falsified. Further, even though display information on an unauthorized PIN pad is output from non-secure first display generating section 109, the unauthorized PIN pad is not displayed in secure display area 29B. If the unauthorized PIN pad is displayed in non-secure display area 29A, the operator of settlement terminal device 100 recognizes that the unauthorized PIN pad is not formal PIN pad 80 displayed in secure display area 29B. Accordingly, the occurrence of unauthorized settlement processing is reduced.

Referring to FIG. 4 again, touch input switching controller 117 and touch input switching/distributing section 114 are provided in secure second information processing unit 41. If it is recognized that touch panel TP is touched, touch input coordinates are detected by touch input detector 27 in a minimum unit of the resolution of touch panel TP, for example. Touch input detector 27 outputs information on the detected touch input coordinates to touch input switching/distributing section 114 in secure second information processing unit 41.

In FIG. 5B, when a detection timing of touch input detector 27 is associated with coordinates in non-secure input area 27A (see FIG. 2A), touch input switching controller 117 turns on switch 114a in touch input switching/distributing section 114, and turns off switch 114b. As a result, the information on the touch input coordinates detected by touch input detector 27 is input to first touch input processing section 107 in non-secure first information processing unit 21 through buffer amplifier 114c and switch 114a.

When the detection timing of touch input detector 27 is associated with coordinates in secure input area 27B (see FIG. 2A), touch input switching controller 117 turns on switch 114b in touch input switching/distributing section 114, and turns off switch 114a. As a result, the information on the touch input coordinates detected by touch input detector 27 is input to second touch input processing section 113 in secure second information processing unit 41 through buffer amplifier 114d and switch 114b. An outer frame of secure input area 27B is set by coordinates on touch input detector 27 corresponding to PIN pad 80 displayed in display section 29 and its periphery.

In settlement terminal device 100 of the present embodiment, an area where non-secure display area 27A and secure display area 27B (see FIG. 2A) are overlapped is not set, but the area where non-secure display area 27A and secure display area 27B are overlapped may be set. When the overlap area is set, touch input switching controller 117 turns on both of switches 114a and 114b in touch input switching/distributing section 114. As a result, the information on the touch input coordinates detected by touch input detector 27 is input to both of first touch input processing section 107 in non-secure first information processing unit 21 and second touch input processing section 113 in secure second information processing unit 41.

Further, when the detection timing of touch input detector 27 is associated with coordinates that do not belong to any one of non-secure input area 27A (see FIG. 2A) and secure input area 27B, touch input switching controller 117 turns off both of switches 114a and 114b in touch input switching/distributing section 114.

As described above, second information processing unit 41 is built in secure module 91 (see FIGS. 1A and 2A). Secure module 91 has the tamper resistance to prevent unauthorized confidential data reading. For example, secure module 91 enhances confidentiality so that reading is not easily performed from the outside. Further, secure module 91 includes a mechanism that detects whether physical confinement is broken. Accordingly, touch input switching controller 117 and touch input switching/distributing section 114 in secure second information processing unit 41 do not undergo unauthorized access or unauthorized control from the outside. As a result, particularly, the information on the touch input coordinates to secure input area 27B (see FIG. 2A) is not wiretapped or falsified. For example, input information such as a PIN which is touch-input to secure input area 27B (see FIG. 2A) is input to second touch input processing section 113 without being wiretapped or falsified, and thus, the occurrence of unauthorized settlement processing is reduced.

As described above, the input of authentication information (for example, PIN information) of a card used in settlement and the display of the input are performed by second touch input processing section 113 and second display generating section 115 in second information processing unit 41. Accordingly, the operator inputs a PIN through touch input to secure input area 27B using formal PIN pad 80 displayed in secure display area 29B, and thus, the occurrence of unauthorized settlement processing is reduced.

An operation of settlement terminal device 100 of the present embodiment having the above-described configuration will be described. FIG. 6 is a flowchart illustrating a settlement processing procedure in settlement terminal device 100 of the present embodiment. Settlement terminal device 100 executes a settlement application installed in first flash ROM 31 in first information processing unit 21 to start a settlement procedure.

In the settlement processing, a process of inputting information relating to settlement (for example, amount information, or payment method) or the like to settlement terminal device 100, a process of displaying a message for urging a reading operation of the card used in settlement, or the like is executed by the member store work application.

Further, a process of displaying PIN pad 80 and a message or the like for urging PIN input, a process of receiving PIN input from an acquirer, an authentication process of collating the input PIN with a card-registered PIN, or the like is executed by the acquirer work application. Here, the authentication process is performed by collating the input PIN with the card-registered PIN, but the input PIN may be collated with a PIN registered in a settlement center, and when both the PINs match each other, credit may be given from the settlement center to perform the authentication process.

First, touch input switching controller 117 in second information processing unit 41 sets coordinates of each of secure input area 27B and non-secure input area 27A on detection surface 27s of touch input detector 27 (S1). Secure input area 27B is represented as secure inputtable coordinates, and is set by coordinates on detection surface 27s of touch input detector 27. In FIG. 2A, a range surrounded by broken line frame a corresponds to secure input area 27B (range of coordinates where secure input can be performed). Similarly, non-secure input area 27A is set by coordinates on detection surface 27s of touch input detector 27. Similarly, non-secure input area 27A is set by coordinates on detection surface 27s of touch input detector 27. In FIG. 2A, a range surrounded by single dot chain line frame b corresponds to non-secure input area 27A (range of coordinates where non-secure input can be performed).

Display switching controller 118 sets coordinates of each of secure display area 29B and non-secure display area 29A on screen 29s of display section 29 (S2). Secure display area 29B is represented as secure displayable coordinates, and is set by coordinates on screen 29s of display section 29. In FIG. 1A, a range surrounded by broken line frame c corresponds to secure display area 29B (range of coordinates where secure display can be performed). Similarly, non-secure display area 29A is set by coordinates on screen 29s of display section 29. In FIG. 1A, a range surrounded by single dot chain line frame d (range of coordinates where non-secure display can be performed) corresponds to non-secure display area 29A.

Then, settlement terminal device 100 executes the settlement processing (S3). In the settlement processing, touch input switching controller 117 controls touch input switching/distributing section 114, and first touch input processing section 107 receives an input of amount information and a payment method from non-secure input area 27A of touch input detector 27. Further, display switching controller 118 controls display switching/overlapping section 116, and first display generating section 109 generates a message for urging a reading operation of a card, and displays the result in non-secure display area 29A of display section 29. The operator inserts and slides a magnetic card in slit 120 according to the message, to thereby read information on the magnetic card.

Subsequently, display switching controller 118 controls display switching/overlapping section 116, and second display generating section 115 generates a message for urging input of PIN information and PIN pad 80, to thereby display the result in secure display area 29B of display section 29.

The operator views PIN pad 80 displayed in secure display area 29B of display section 29, and then, touch-inputs the PIN information. Touch input switching controller 117 controls touch input switching/distributing section 114, and second touch input processing section 113 receives an input of the PIN information from secure input area 27B of touch input detector 27.

Second CPU 42 collates the input PIN information with PIN information registered in advance in the magnetic card, and outputs the collation result. When the collation result represents that the input PIN information and the PIN information registered in the magnetic card match each other, second CPU 42 instructs first CPU 22 to perform sales processing as a subsequent settlement processing. Further, first CPU 22 performs the sales processing, and transmits sales processing data after the sales processing to the settlement center through wide area wireless communicating section 25.

On the other hand, the collation result represents that both the PINs do not match each other, display switching controller 118 controls display switching/overlapping section 116, and second display generating section 115 generates a message for stopping the settlement processing and displays the result in secure display area 29B of display section 29. In this case, second CPU 42 does not instruct first CPU 22 to perform the sales processing, and stops the procedure of the subsequent settlement processing.

If the execution of the settlement processing is completed or the execution is stopped, touch input switching controller 117 returns touch input detector 27 to a value before accounting processing (S4). That is, the coordinates of each of secure input area 27B and non-secure input area 27A may be changed to a default value (range), or may be changed to a value different from a value (range) in accounting processing.

Further, display switching controller 118 returns display section 29 to a value before accounting processing (S5). That is, the coordinates of each of secure display area 29B and non-secure display area 29A may be changed to a default value (range), or may be changed to a value different from a value (range) in accounting processing. Then, the operation is terminated.

In settlement terminal device 100, for example, the coordinates of non-secure display area 29A are set in range of about ⅓ of the upper part of touch panel TP. Further, the coordinates of secure display area 29B are set to in range of about ¾ from the lower part of touch panel TP to the upper part thereof. On the other hand, the coordinates of non-secure input area 27A are set to in range of about ⅓ of the upper part of touch panel TP. Further, the coordinates of secure input area 27B are set in range of about ⅓ from the central part of touch panel TP to the lower part thereof.

When performing the settlement processing, in the display area where non-secure display area 29A and secure display area 29B are overlapped, a settlement amount, for example, "total purchase amount 128,000 Yen (tax included)" is displayed. Further, a message for urging authentication information, for example, "Please input password", and PIN pad 80 are displayed in secure display area 29B. The operator approximately knows in advance a position where non-secure display area 29A and secure display area 29B are set on screen 29s. Further, the operator knows that secure input area 27B (range of coordinates where secure input can be performed) is set inside secure display area 29B (range of coordinates where secure display can be performed). Accordingly, the operator can safely input PIN information through PIN pad 80 that is displayed in secure display area 29B and is disposed in secure input area 27B.

Thus, even when a secure portion (second information processing unit 41) and a non-secure portion (first information processing unit 21) are present together, settlement terminal device 100 of the present embodiment can secure the security of authentication information or the like, and can suppress an operator's mistake or incorrect operation.

For example, with respect to an unauthorized application, information is displayed in the secure display area, and thus, input information cannot be received from the secure input area. Accordingly, settlement terminal device 100 can reduce loss generated when the unauthorized application acquires a certificate without permission and performs unauthorized behavior like a formal application, for example, theft or falsification of a PIN or a signature, an unauthorized transaction, or the like.

Further, by displaying information in the secure display area, settlement terminal device 100 can inform the operator that the area is an area where the safety of input of authentication information or the like is guaranteed, and the operator can easily recognize that the area is an input area where the security is guaranteed, and can safely input authentication information or the like for the transaction. Accordingly, settlement terminal device 100 can safely process the authentication information or the like.

In addition, when performing the authentication process or the like, settlement terminal device 100 can perform the display and input processing using the secure display area and the secure input area. On the other hand, when performing a process other than the authentication process or the like, settlement terminal device 100 can perform the display and input processing using the non-secure display area and the non-secure input area.

Further, settlement terminal device 100 can distinguish areas where the input and display are performed between the non-secure area and the secure area, to thereby perform safe processing. Since the touch input detector and the display section are configured by touch panel TP, the correspondence relationship between the detection surface and the screen becomes clear.

Since the area where secure display area 29B (range of coordinates where secure display can be performed) and non-secure display area 29A (range of coordinates where non-secure display can be performed) are overlapped and displayed is present, settlement terminal device 100 can display information in an appropriate area.

Since secure input area 27B (range of coordinates where secure input can be performed) is set inside secure display area 29B (range of coordinates where secure display can be performed), settlement terminal device 100 can cause the operator to recognize the secure input area even without particular indication.

Further, since information for urging an operation with respect to the secure input area is generated as information displayed in the secure display area, settlement terminal device 100 can easily recognize the operation with respect to the secure input area by the information displayed in the secure display area.

Modification Example of First Exemplary Embodiment

In the above-described first exemplary embodiment, a case where the PIN pad for receiving the PIN input is displayed in the secure display area as the authentication information is described, but in a modification example of the first exemplary embodiment, a case where a signature input section for receiving an input of a signature is displayed in the secure display area will be described.

FIG. 7A is a front view of settlement terminal device 100 indicating a displayable area according to a modification example of the first exemplary embodiment. FIG. 7A is a side view of settlement terminal device 100 shown in FIG. 7A. FIG. 7B is an enlarged view of a portion surrounded by double dot chain line frame e1 shown in FIG. 7A. FIG. 7C is an enlarged view of a portion surrounded by double dot chain line frame f1 shown in FIG. 7A. In this modification example, since secure display area 29B (range of coordinates where secure display can be performed) and non-secure display area 29A (range of coordinates where non-secure display can be performed) set on screen 29s of display section 29 are the same as in the first exemplary embodiment, detailed description thereof will not be repeated.

Amount information is displayed in non-secure display area 29A. Further, signature input section 133 is displayed in secure display area 29B as secure information. A message for urging a signature of the operator, for example, "Please sign in frame" is displayed together with an arrow indicating signature input section 133.

Figure 8A:
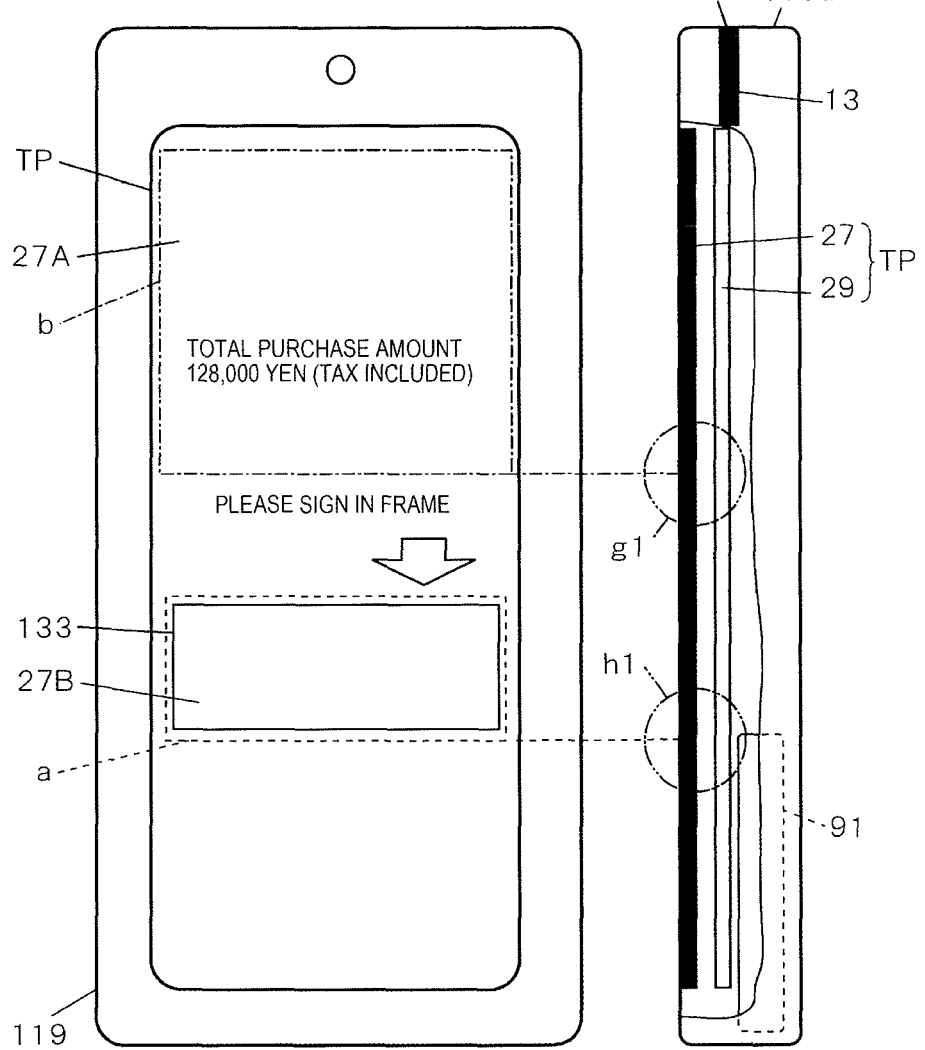
FIG. 8A is a front view and a side view of a settlement terminal device indicating an inputtable area according to a modification example of the first exemplary embodiment.
Figure 8C:
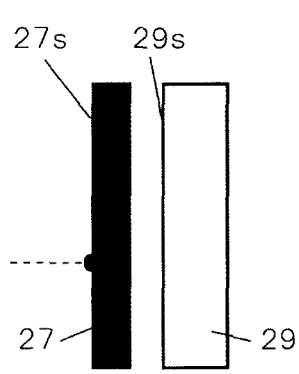
FIG. 8C is an enlarged view of a portion surrounded by double dot chain line frame h1 shown in FIG. 8A.
Figure 8B:
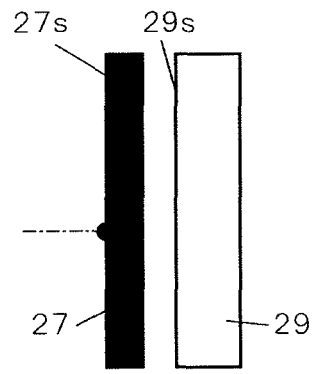
FIG. 8B is an enlarged view of a portion surrounded by double dot chain line frame g1 shown in FIG. 8A.

FIG. 8A is a front view of settlement terminal device 100 indicating an inputtable area according to a modification example of the first exemplary embodiment. FIG. 8A is a side view of settlement terminal device 100 shown in FIG. 8A. FIG. 8B is an enlarged view of a portion surrounded by double dot chain line frame g1 shown in FIG. 8A. FIG. 8C is an enlarged view of a portion surrounded by double dot chain line frame h1 shown in FIG. 8A.

Non-secure input area 27A (range of coordinates where non-secure input can be performed; see a single dot chain line shown in FIG. 8A) is set in the same range as that of the first exemplary embodiment. On the other hand, secure input area 27B (range of coordinates where secure input can be performed; see a broken line shown in FIG. 8A) is set to be narrower than that of the first exemplary embodiment, and is set to surround signature input section 133.

As shown in FIGS. 7A and 8A, coordinates for setting an outer frame of non-secure input area 27A (see the single dot chain line shown in FIG. 8A) and coordinates for setting an outer frame of non-secure display area 29A (see the single dot chain line shown in FIG. 7A) may be different from each other. Further, coordinates for setting an outer frame of secure input area 27B (see broken line shown in FIG. 8A) and coordinates for setting an outer frame of secure display area 29B (see the broken line shown in FIG. 7A) may be different from each other. Further, outer frame shapes of non-secure input area 27A, secure input area 27B, non-secure display area 29A, and secure display area 29B may be an arbitrary shape other than the rectangular shapes shown in FIGS. 7A and 8A.

Settlement terminal device 100 of the modification example of the first exemplary embodiment also uses the control described with reference to FIGS. 4, 5A, and 5B. That is, in FIG. 5A, when the display timing of display section 29 is associated with pixels in non-secure display area 29A (see FIG. 1A), display switching controller 118 turns on switch 116a, and turns off switch 116b. As a result, the display information from first display generating section 109 is input to display section 29 through switch 116a and adder 116c. Display section 29 displays the display information from first display generating section 109.

When the display timing of display section 29 is associated with pixels in secure display area 29B (see FIG. 1A), display switching controller 118 turns on switch 116b in display switching/overlapping section 116, and turns off switch 116a. As a result, the display information from secure second display generating section 115 is input to display section 29 through switch 116b and adder 116c. Display section 29 displays the display information from second display generating section 115. In settlement terminal device 100 of the modification example of the first exemplary embodiment, for example, a message for urging a signature of the operator ("Please sign in frame"), signature input section 133, an arrow indicating signature input section 133, and the like are displayed on secure display area 29B.

When the display timing of display section 29 is associated with pixels in the area where non-secure display area 29A and secure display area 29B (see FIG. 1A) are overlapped, display switching controller 118 turns on both of switches 116a and 116b in display switching/overlapping section 116. As a result, the display information from non-secure first display generating section 109 and the display information from secure second display generating section 115 are overlapped by adder 116c to be input to display section 29. In settlement terminal device 100 of the modification example of the first exemplary embodiment, for example, settlement amount information ("total purchase amount 128,000 Yen (tax included)") is displayed in the overlap area. The settlement amount information in settlement terminal device 100 of the modification example of the first exemplary embodiment is output from non-secure first display generating section 109. That is, the information output from secure second display generating section 115 is displayed in the settlement processing, and the information output from non-secure first display generating section 109 is displayed in other processing (work processing or generic application (e-mail, browser or the like)). In other words, settlement terminal device 100 can display the non-secure information in the area where non-secure display can be displayed (area of non-secure display area 29A which is not overlapped with secure display area 29B) and also in the coordinate area where non-secure display area 29A is overlapped with secure display area 29B. Accordingly, settlement terminal device 100 can efficiently display the non-secure information using display section 29 of which the display area is limited.

In FIG. 5B, when the detection timing of touch input detector 27 is associated with coordinates in non-secure input area 27A (see FIG. 8A), touch input switching controller 117 turns on switch 114a in touch input switching/distributing section 114, and turns off switch 114b. As a result, the information on the touch input coordinates detected by touch input detector 27 is input to first touch input processing section 107 in non-secure first information processing unit 21 through buffer amplifier 114c and switch 114a.

When the detection timing of touch input detector 27 is associated with coordinates in secure input area 27B (see FIG. 8A), touch input switching controller 117 turns on switch 114b in touch input switching/distributing section 114, and turns off switch 114a. As a result, the information on touch input coordinates detected by touch input detector 27 is input to second touch input processing section 113 in secure second information processing unit 41 through buffer amplifier 114d and switch 114b. An outer frame of secure input area 27B is set by coordinates on touch input detector 27 corresponding to of signature input section 133 displayed in display section 29 and its periphery.

In settlement terminal device 100 of the modification example of the first exemplary embodiment, the area where non-secure input area 27A and secure input area 27B (see FIG. 2A) are overlapped is not set, but the overlap area may be set. When the overlap area is set, touch input switching controller 117 turns on both of switches 114a and 114b in touch input switching/distributing section 114. As a result, the information on the touch input coordinates detected by touch input detector 27 is input to both of first touch input processing section 107 in non-secure first information processing unit 21 and second touch input processing section 113 in secure-second information processing unit 41.

Further, when the detection timing of touch input detector 27 is associated with coordinates that do not belong to any one of non-secure input area 27A (see FIG. 2A) and secure input area 27B, touch input switching controller 117 turns off both of switches 114a and 114b in touch input switching/distributing section 114.

The display information to secure display area 29B (see FIG. 1A) is not falsified due to the control described with reference to FIGS. 4, 5A and 5B. For example, the message for urging the signature displayed in secure display area 29B (see FIG. 1A) ("Please sign in frame"), signature input section 133, the arrow indicating signature input section 133, and the like are displayed in secure display area 29B of display section 29 without being falsified. Further, even though an unauthorized signature input section, a message for urging a signature, or the like is output from non-secure first display generating section 109, this is not displayed in secure display area 29B. Even though an unauthorized signature input section 133 or the like is displayed in non-secure display area 29A, the operator of settlement terminal device 100 recognizes that unauthorized signature input section 133 or the like is not formal signature input section 133 displayed in secure display area 29B and the message for urging the signature, or the like. Accordingly, the occurrence of unauthorized settlement processing is reduced.

Further, touch input switching controller 117 and touch input switching/distributing section 114 in secure second information processing unit 41 do not undergo unauthorized access or unauthorized control from the outside. As a result, particularly, information on the touch input coordinates to secure input area 27B (see FIG. 2A) is not wiretapped or falsified. For example, input information such as a signature which is touch-input to secure input area 27B (see FIG. 2A) is input to second touch input processing section 113 without being wiretapped or falsified, and thus, the occurrence of unauthorized settlement processing is reduced.

As described above, the input of the authentication information (for example, signature) of the card used for settlement and the display of the input are performed by second touch input processing section 113 and second display generating section 115 in second information processing unit 41. Accordingly, since the operator inputs the PIN through touch input to secure input area 27B (see FIG. 8A) using formal signature input section 133 displayed in secure display area 29B (see FIG. 7A), the occurrence of unauthorized settlement processing is reduced.

As described above, in the settlement terminal device of the modification of the first exemplary embodiment, the same operation as in the first exemplary embodiment is performed except that the signature is written using a pen or the like. Since the operator knows that secure input area 27B (range of coordinates where secure input can be performed) is set inside secure display area 29B (range of coordinates where secure display can be performed), the operator can safely sign a signature with respect to signature input section 133 that is displayed in secure display area 29B and is disposed in secure input area 27B.

Second Exemplary Embodiment

In the first exemplary embodiment, a single touch panel having displayable and inputtable areas is used, but in a second exemplary embodiment, two touch panels are used. Since a settlement terminal device of the second exemplary embodiment has approximately the same configuration as that of the first exemplary embodiment, the same reference numerals are given to the same components as those of the first exemplary embodiment, and description thereof will not be repeated.

FIG. 9A is a front view and a side view of settlement terminal device 100A indicating a displayable area according to the second exemplary embodiment. FIG. 9B is an enlarged view of a portion surrounded by double dot chain line frame e2 shown in FIG. 9A. FIG. 9C is an enlarged view of a portion surrounded by double dot chain line frame f2 shown in FIG. 9A.

Settlement terminal device 100A includes first touch panel TP1 and second touch panel TP2 as two touch panels. Specifically, first touch panel TP1 provided in first information processing unit 21A is disposed on an operational surface of housing 119 in an upper part of the figure. Further, second touch panel TP2 provided in second information processing unit 41A is disposed on an operational surface of housing 119 in a lower part of the figure. Between first touch panel TP1 and second touch panel TP2 in housing 119, non-secure LED 95 lighted in a non-secure state is disposed.

First touch panel TP1 has a structure in which first touch input detector 127 and first display section 129 are overlapped. Similarly, second touch panel TP2 has a structure in which second touch input detector 137 and second display section 139 are overlapped.

On screen 129s of first display section 129 of first touch panel TP1, non-secure display area 129A (range of coordinates where non-secure display can be performed; see a single dot chain line shown in FIG. 9A) and secure display area 129B (range of coordinates where secure display can be performed; see a broken line shown in FIG. 9A) are set to be partially overlapped. In FIG. 9A, on a display area where non-secure display area 129A and secure display area 129B are overlapped (range of coordinates where secure display and non-secure display can be performed), for example, amount information is displayed as non-secure information.

Further, in secure display area 139B of second display section 139 of second touch panel TP2, PIN pad 80 is displayed as secure content.

Figure 10A:
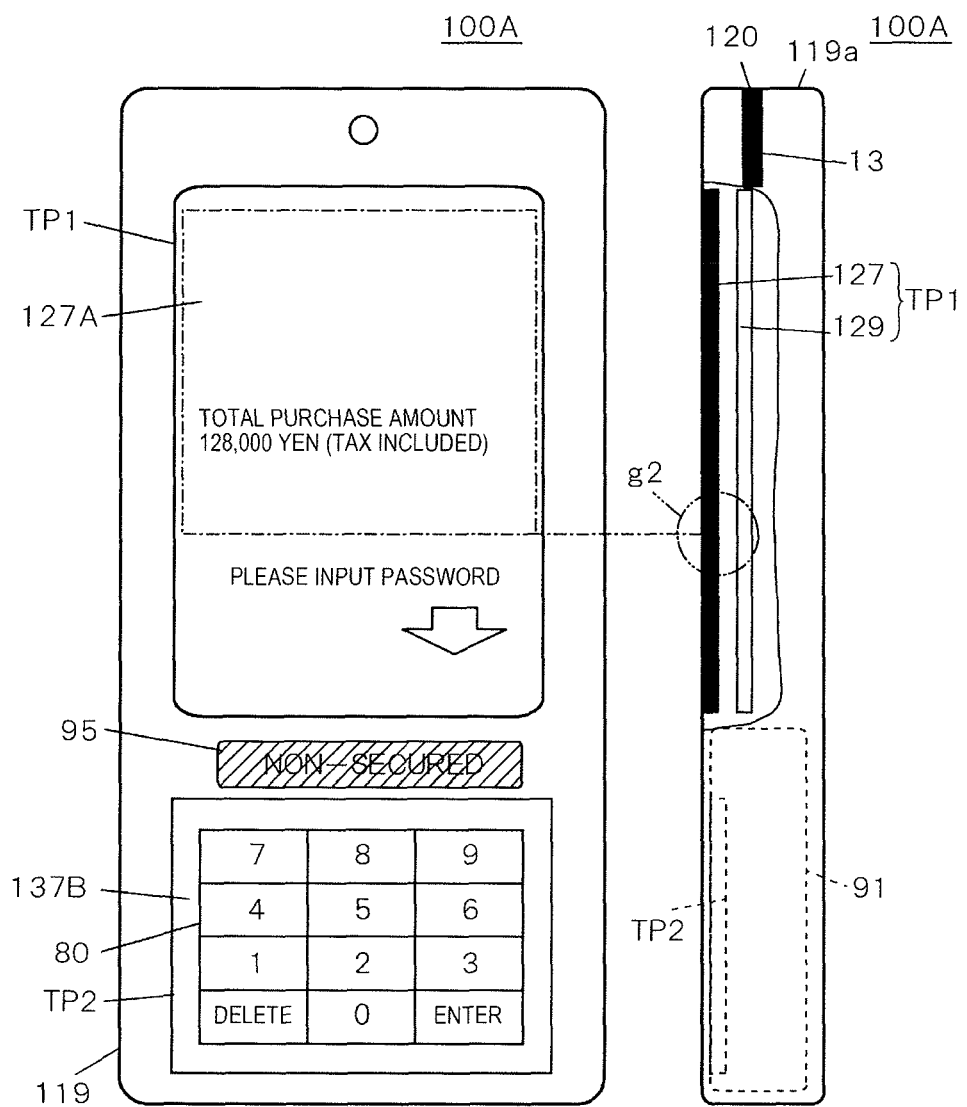
FIG. 10A is a front view and a side view of a settlement terminal device indicating an inputtable area according to the second exemplary embodiment.
Figure 10B:
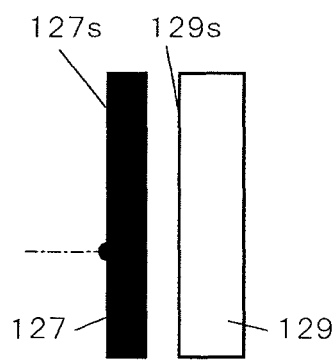
FIG. 10B is an enlarged view of a portion surrounded by double dot chain line frame g2 shown in FIG. 10A.

FIG. 10A is a front view and a side view of settlement terminal device 100A indicating an inputtable area according to the second exemplary embodiment. FIG. 10B is an enlarged view of a portion surrounded by double dot chain line frame g2 shown in FIG. 10A.

On detection surface 127s of first touch input detector 127 of first touch panel TP1, non-secure input area 127A (range of coordinates where non-secure input can be performed; see a single dot chain line shown in FIG. 10A) is set. A secure input area is not set on detection surface 127s. Further, on a detection surface (not shown) of second touch input detector 137 of second touch panel TP2, secure input area 137B (range of coordinates where secure input can be performed) is set.

In this way, first touch panel TP1 displays amount information as non-secure information, and receives an input of amount. On the other hand, second touch panel TP2 displays PIN pad 80 as secure information, and receives an input of a PIN.

As shown in FIGS. 9A and 10A, coordinates for setting an outer frame of non-secure input area 127A and coordinates for setting an outer frame of non-secure display area 129A may be different from each other. Further, in the present exemplary embodiment, since a secure input area is not set on detection surface 127s of first touch input detector 127, only the coordinates for setting the outer frame of secure display area 129B are set on detection surface 127s of first touch input detector 127. In addition, the outer frame shapes of secure input area 137B shown in FIG. 10A, non-secure input area 127A shown in FIG. 9A, non-secure display area 129A shown in FIG. 9A, and secure display area 129B shown in FIG. 9A may be arbitrary shapes other than rectangular shapes shown in FIGS. 9A and 10A.

Figure 11:
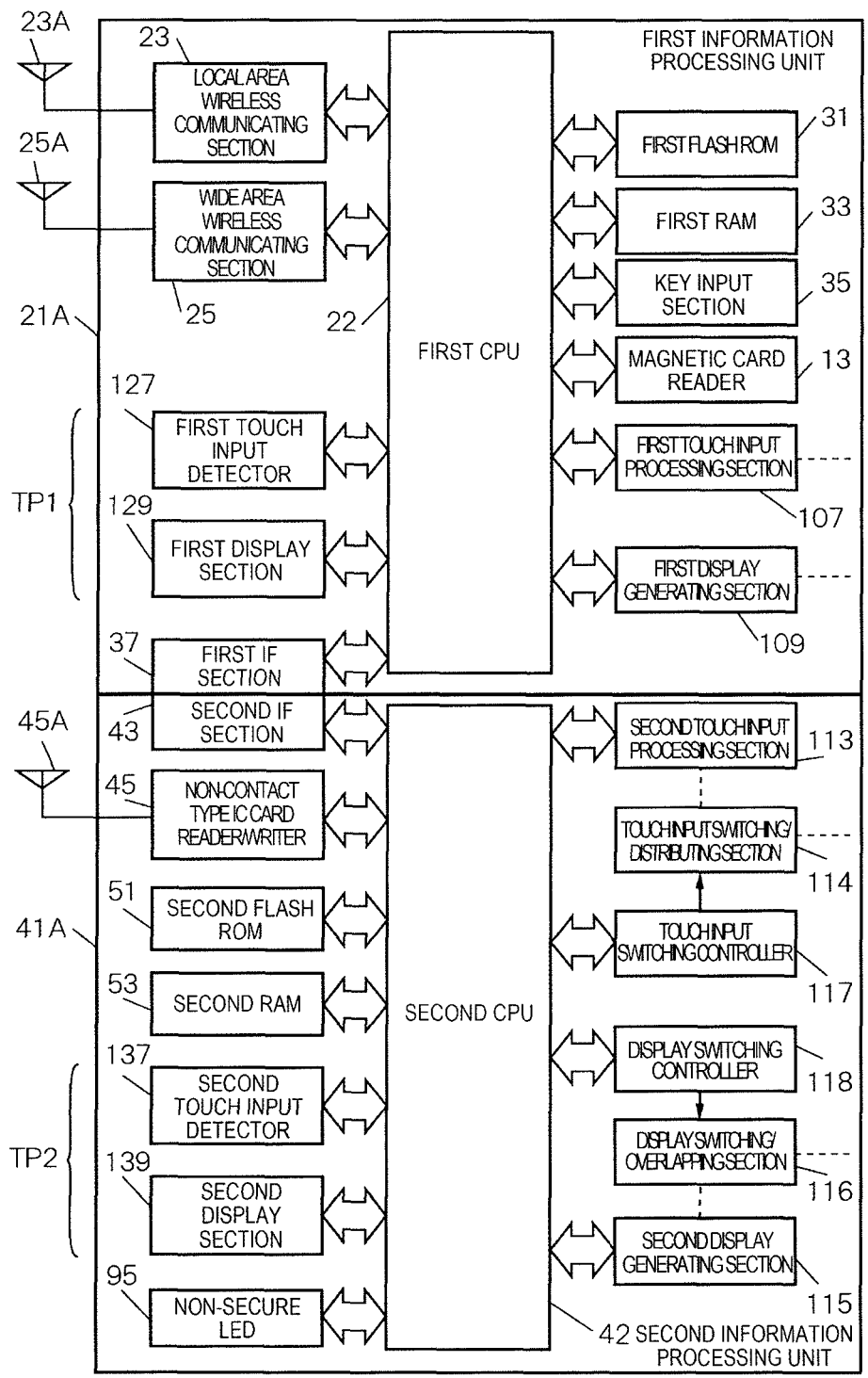
FIG. 11 is a block diagram illustrating an example of a hardware configuration of the settlement terminal device according to the second exemplary embodiment.

FIG. 11 is a block diagram illustrating an example of a hardware configuration of settlement terminal device 100A according to the second exemplary embodiment. In settlement terminal device 100A of the second exemplary embodiment, first information processing unit 21A has approximately the same configuration as that of the first exemplary embodiment except that small first touch panel TP1 is provided compared with touch panel TP of the first exemplary embodiment. First touch panel TP1 is configured by first touch input detector 127 and first display section 129.

Further, second information processing unit 41A has approximately the same configuration as that of the first exemplary embodiment except that second touch panel TP2 and non-secure LED 95 are provided compared with the case of the first exemplary embodiment. Second touch panel TP2 is configured by second touch input detector 137 and second display section 139.

In first information processing unit 21A, first display generating section 109 generates image data to be displayed in non-secure display area 129A of first touch panel TP1. First touch input processing section 107 performs input processing of the touch input (coordinates data) detected by non-secure input area 127A of first touch panel TP1.

In second information processing unit 41A, second display generating section 115 generates image data to be displayed in secure display area 129B of first touch panel TP1, and generates image data to be displayed in secure display area 139B of second touch panel TP2. Second touch input processing section 113 performs input processing of the touch input (coordinates data) detected by secure input area 137B of second touch panel TP2.

When displaying image data in the non-secure display area, display switching/overlapping section 116 outputs image data generated by first display generating section 109 to first display section 129 according to a switching/overlap instruction from display switching controller 118. Further, when displaying image data in the secure display area, display switching/overlapping section 116 outputs image data generated by second display generating section 115 to first display section 129 or second display section 139 according to a switching/overlap instruction from display switching controller 118.

When the coordinates of the touch input detected by first touch input detector 127 are in non-secure input area 127A (range of coordinates where non-secure input can be performed; see the single dot chain line shown in FIG. 10A), touch input switching/distributing section 114 outputs input information to first touch input processing section 107 according to a switching/distribution instruction from touch input switching controller 117. Further, when the coordinates of the touch input detected by first touch input detector 127 are in secure input area 137B (range of coordinates where secure input can be performed), touch input switching/distributing section 114 outputs input information to second touch input processing section 113 according to the switching/distribution instruction from touch input switching controller 117. In FIG. 10A, as an example, a case where the secure input area (range of coordinates where secure input can be performed) is not set on detection surface 127s of first touch input detector 127 is shown.

On the other hand, when the coordinates of the touch input detected by second touch input detector 137 are in secure input area 137B (range of coordinates where secure input can be performed), touch input switching/distributing section 114 outputs input information to second touch input processing section 113 according to the switching/distribution instruction from touch input switching controller 117. Further, when the coordinates of the touch input detected by second touch input detector 137 are in an input area other than secure input area 137B (for example, non-secure input area 127A shown in FIG. 10A (range of coordinates where non-secure input can be performed), touch input switching/distributing section 114 outputs input information to first touch input processing section 107 according to the switching/distribution instruction from touch input switching controller 117. In FIG. 10A, as an example, a case where the non-secure input area (range of coordinates where non-secure input can be performed) is not set on the detection surface of second touch input detector 137 is shown.

Further, when the coordinates of the touch input is detected in secure second input area 137B (range of coordinates where secure input can be performed) of second touch input detector 137 according to the switching/distribution instruction from touch input switching controller 117, non-secure LED 95 is lighted according to an instruction from second CPU 42. The operator easily recognizes that first touch panel TP1 is in a state where non-secure display and input can be performed, through the lighting.

In settlement terminal device 100A, non-secure display area 129A (range of coordinates where non-secure display can be performed) and secure display area 129B (range of coordinates where secure display can be performed) are set in first touch panel TP1. Further, secure display area 139B (range of coordinates where secure display can be performed) is set in second touch panel TP2.

Settlement terminal device 100A of the present exemplary embodiment uses the control described with reference to FIGS. 4, 5A, and 5B with respect to first touch panel TP1. That is, the portions of "touch panel TP", "touch input detector 27", and "display section 29" in FIGS. 4, 5A, and 5B can be replaced with "first touch panel TP1", "first touch input detector 127", and "first display section 129", respectively.

More specifically, in FIG. 5A, when the display timing of first display section 129 is associated with pixels in non-secure display area 129A (see FIG. 9A), display switching controller 118 turns on switch 116a, and turns off switch 116b. As a result, the display information from first display generating section 109 is input to first display section 129 through switch 116a and adder 116c. First display section 129 displays the display information from first display generating section 109.

When the display timing of first display section 129 is associated with pixels in secure display area 129B (see FIG. 9A), display switching controller 118 turns on switch 116b, and turns off switch 116a in display switching/overlapping section 116. As a result, the display information from secure second display generating section 115 is input to first display section 129 through switch 116b and adder 116c. First display section 129 displays the display information from second display generating section 115. Here, PIN pad 80 of settlement terminal device 100A of the present exemplary embodiment is not displayed in secure display area 129B of first touch panel TP1, but is displayed in second touch panel TP2 of which the entirety is secure display area 139B. Accordingly, in secure display area 129B of first touch panel TP1, a sufficient display area is secured with respect to secure information (for example, settlement processing situation) other than PIN pad 80.

When the display timing of first display section 129 is associated with pixels in the area where non-secure display area 129A and secure display area 129B (see FIG. 9A) are overlapped, display switching controller 118 turns on both of switches 116a and 116b in display switching/overlapping section 116. As a result, the display information from non-secure first display generating section 109 and the display information from secure second display generating section 115 are overlapped by adder 116c to be input to first display section 129. In settlement terminal device 100 of the present exemplary embodiment, in the overlap area, for example, settlement amount information ("total purchase amount 128,000 Yen (tax included)" is displayed. The settlement amount information in settlement terminal device 100 of the present exemplary embodiment is output from non-secure first display generating section 109. That is, the information output from secure second display generating section 115 is displayed in the settlement processing, and the information output from non-secure first display generating section 109 is displayed in other processing (work processing or generic application (e-mail, browser or the like)). Accordingly, settlement terminal device 100A can efficiently use first display section 129 of which the display area is limited.

Further, when the display timing of first display section 129 is associated with pixels that do not belong to any one of non-secure display area 129A and secure display area 129B (see FIG. 1A), display switching controller 118 turns off both of switches 116a and 116b in display switching/overlapping section 116.

In FIG. 5B, when the detection timing of touch input detector 27 is associated with coordinates in non-secure input area 27A (see FIG. 2A), touch input switching controller 117 turns on switch 114a in touch input switching/distributing section 114, and turns off switch 114b. As a result, the information on the touch input coordinates detected by touch input detector 27 is input to first touch input processing section 107 in non-secure first information processing unit 21 through buffer amplifier 114c and switch 114a.

In settlement terminal device 100A of the present exemplary embodiment, a secure input area with respect to first touch panel TP1 is not set. Accordingly, when the detection timing of touch input detector 27 is associated with coordinates other than non-secure input area 27A (see FIG. 2A), touch input switching controller 117 turns off both of switches 114a and 114b in touch input switching/distributing section 114. Further, in second touch panel TP2, all inputtable coordinates are set as secure input area 137B.

Display information to secure display area 129B (see FIG. 9A) is not falsified due to the control described with reference to FIGS. 4, 5A and 5B. Even though an unauthorized PIN pad is output from non-secure first display generating section 109, the unauthorized PIN pad is not displayed in secure display area 129B and secure display area 139B of second touch panel TP2. Even though an unauthorized PIN pad is displayed in non-secure display area 129A, the operator of settlement terminal device 100A recognizes that the unauthorized PIN pad is not the formal signature input section 133 displayed in second touch panel TP2 of which the entirety is secure display area 139B. Accordingly, the occurrence of unauthorized settlement processing is reduced.

Further, touch input switching controller 117 and touch input switching/distributing section 114 (see FIGS. 4 and 5B) in secure second information processing unit 41 do not undergo unauthorized access or unauthorized control from the outside. The secure input area is not set in first touch panel TP1, and thus, information on touch input coordinates to second touch panel TP2 of which the entirety is secure input area 137B (see FIG. 10A) is not wiretapped or falsified. For example, input information such as a PIN which is touch-input to secure input area 137B (see FIG. 10A) is input to second touch input processing section 113 without being wiretapped or falsified, and thus, the occurrence of unauthorized settlement processing is reduced.

When performing the settlement processing, in the display area where non-secure display area 129A of first touch panel TP1 and secure display area 129B are overlapped, amount information, for example, "total purchase amount 128,000 Yen (tax included)" is displayed. Further, a message for urging authentication information, for example, "Please input password" is displayed in secure display area 129B. PIN pad 80 is displayed in non-secure display area 139B of second touch panel TP2.

The operator approximately knows in advance a position where non-secure display area 129A and secure display area 129B are set on screen 129s. Further, non-secure LED 95 is turned off. The operator can safely input PIN information to secure input area 137B of second touch panel TP2 through PIN pad 80 according to the message displayed in secure display area 129B of first touch panel TP1.

As described above, the input of the authentication information (for example, PIN) of the card used for settlement and the display of the input are performed by second touch panel TP2 of which the entirety is secure input area 137B (see FIG. 10A). Accordingly, the operator inputs the PIN using formal PIN pad 80 displayed in secure input area 137B (see FIG. 10A), and thus, the occurrence of unauthorized settlement processing is reduced.

Thus, even when a secure portion (second information processing unit) and a non-secure portion (first information processing unit) are present together, settlement terminal device 100A of the present exemplary embodiment can secure the security of the authentication information or the like, and can suppress an operator's mistake or incorrect operation. Further, since settlement terminal device 100A includes the second touch panel in which the secure input area (range of coordinates where secure input can be performed) is set, in addition to the first touch panel, it is easy to know a position where the authentication information or the like is input.

Modification Example of Second Exemplary Embodiment

In the above-described second exemplary embodiment, a case where the PIN pad for receiving the PIN input is displayed in the secure display area as the authentication information is described, but in the second exemplary embodiment, a case where a signature input section for receiving an input of a signature is displayed in the secure display area will be described.

Figure 12A:
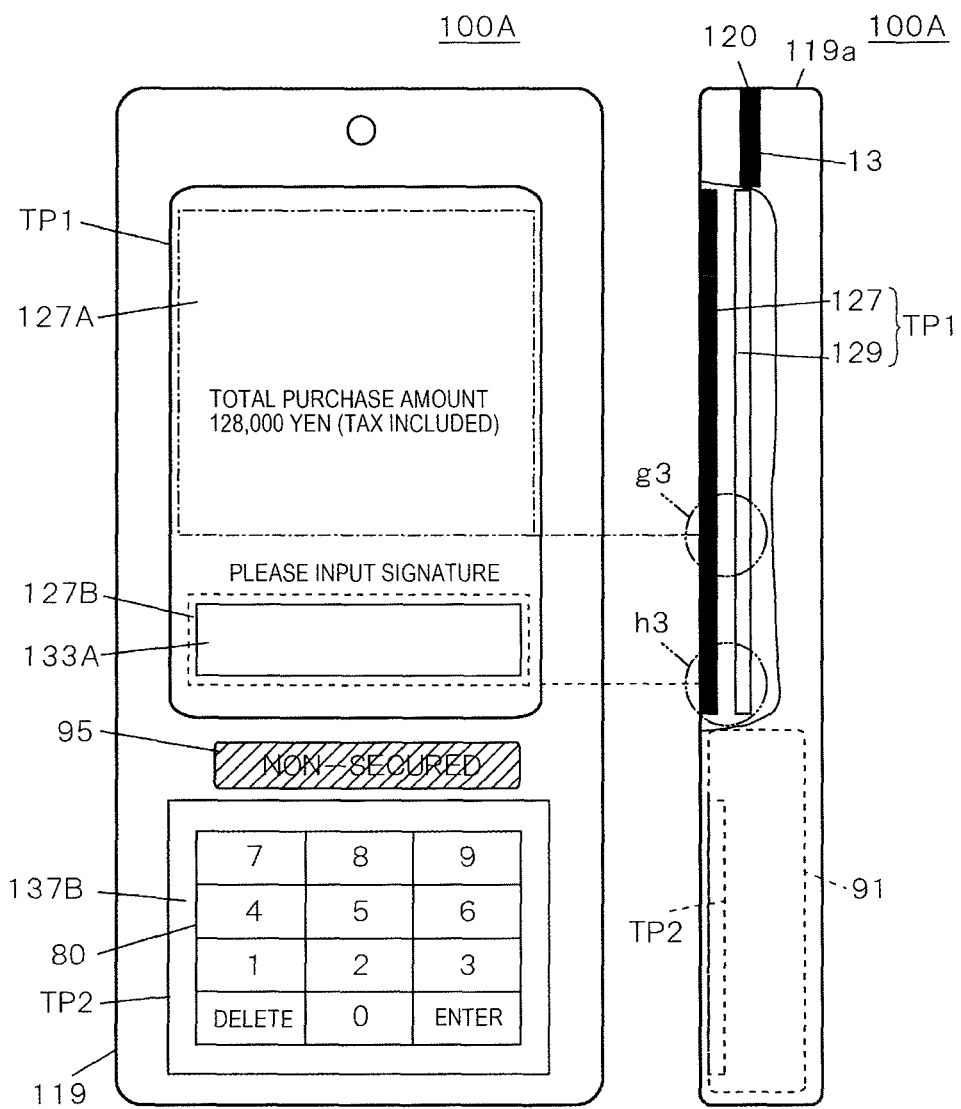
FIG. 12A is a front view and a side view of a settlement terminal device indicating an inputtable area according to a modification example of the second exemplary embodiment.
Figure 12C:
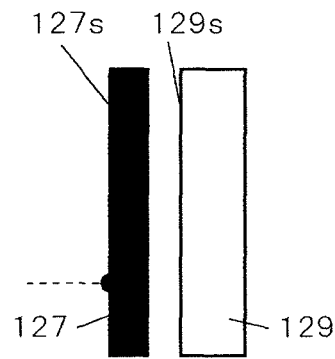
FIG. 12C is an enlarged view of a portion surrounded by double dot chain line frame h3 shown in FIG. 12A.
Figure 12B:
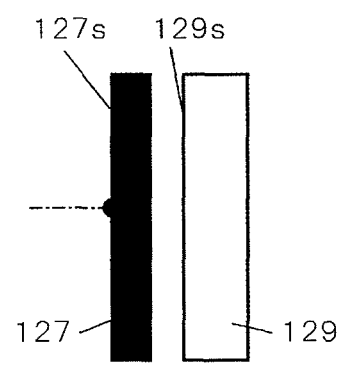
FIG. 12B is an enlarged view of a portion surrounded by double dot chain line frame g3 shown in FIG. 12A.

FIG. 12A is a front view and a side view of a settlement terminal device 100A indicating an inputtable area according to a modification example of the second exemplary embodiment. FIG. 12B is an enlarged view of a portion surrounded by double dot chain line frame g3 shown in FIG. 12A. FIG. 12C is an enlarged view of a portion surrounded by double dot chain line frame h3 shown in FIG. 12A.

As shown in FIGS. 9A and 12A, coordinates for setting an outer frame of non-secure input area 127A (see a single dot chain line shown in FIG. 12A) and coordinates for setting an outer frame of non-secure display area 129A (see a single dot chain line shown in FIG. 9A) may be different from each other. Further, coordinates for setting an outer frame of secure input area 127B (see a broken line shown in FIG. 12A) and coordinates for setting an outer frame of secure display area 129B (see a broken line shown in FIG. 9A) may be different from each other. Further, outer frame shapes of non-secure input area 127A, secure input area 127B, non-secure display area 129A, and secure display area 129B may be arbitrary shapes other than rectangular shapes shown in FIGS. 9A and 12A.

Settlement terminal device 100A of the modification example of the second exemplary embodiment also uses the control described with reference to FIGS. 4, 5A, and 5B, with respect to first touch panel TP1. That is, in FIGS. 4, 5A, and 5B, the portions of "touch panel TP", "touch input detector 27", and "display section 29" can be replaced with "first touch panel TP1", "first touch input detector 127", and "first display section 129", respectively, in the modification example of the second exemplary embodiment.

More specifically, in FIG. 5A, when the detection timing of first display section 129 is associated with pixels in non-secure display area 129A (see FIG. 9A), display switching controller 118 turns on switch 116a, and turns off switch 116b. As a result, the display information from first display generating section 109 is input to first display section 129 through switch 116a and adder 116c. First display section 129 displays the display information from first display generating section 109.

When the detection timing of first display section 129 is associated with pixels in secure display area 129B (see FIG. 9A), display switching controller 118 turns on switch 116b, and turns off switch 116a in display switching/overlapping section 116. As a result, the display information from secure second display generating section 115 is input to first display section 129 through switch 116b and adder 116c. First display section 129 displays the display information from second display generating section 115. In settlement terminal device 100A of the modification example of the second exemplary embodiment, a message for urging a signature ("Please sign in frame"), signature input section 133A, an arrow indicating signature input section 133A, and the like (see FIG. 12A) are displayed in secure display area 129B.

When the detection timing of first display section 129 is associated with pixels in the area where non-secure display area 129A and secure display area 129B (see FIG. 9A) are overlapped, display switching controller 118 turns on both of switches 116a and 116b in display switching/overlapping section 116. As a result, the display information from non-secure first display generating section 109 and the display information from secure second display generating section 115 are overlapped by adder 116c to be input to first display section 129. In settlement terminal device 100A of the modification example of the second exemplary embodiment, for example, settlement amount information ("total purchase amount 128,000 Yen (tax included)") is displayed in the overlap area. The settlement amount information in settlement terminal device 100A of the modification example of the second exemplary embodiment is output from non-secure first display generating section 109. The information output from secure second display generating section 115 may be displayed in the overlap area. That is, the information output from secure second display generating section 115 is displayed in the settlement processing, and the information output from non-secure first display generating section 109 is displayed in other processing (work processing or generic application (e-mail, browser or the like)).

Accordingly, settlement terminal device 100A can efficiently use first display section 129 of which the display area is limited.

When the display timing of first display section 129 is associated with pixels that do not belong to any one of non-secure display area 129A and secure display area 129B (see FIG. 1A), display switching controller 118 turns off both of switches 116a and 116b in display switching/overlapping section 116.

In FIG. 5B, when the detection timing of first touch input detector 127 is associated with coordinates in non-secure input area 127A (see FIGS. 12A to 12C), touch input switching controller 117 turns on switch 114a in touch input switching/distributing section 114, and turns off switch 114b. As a result, the information on the touch input coordinates detected by first touch input detector 127 is input to first touch input processing section 107 in non-secure first information processing unit 21 through buffer amplifier 114c and switch 114a.

When the detection timing of first touch input detector 127 is associated with coordinates in secure input area 127B (see FIG. 12A), touch input switching controller 117 turns on switch 114b, and turns off switch 114a in touch input switching/distributing section 114. As a result, the information on the touch input coordinates detected by first touch input detector 127 is input to second touch input processing section 113 in secure second information processing unit 41 through buffer amplifier 114d and switch 114b. An outer frame of secure input area 127B is set by coordinates on first touch input detector 127 corresponding to signature input section 133A (see FIG. 10A) displayed in first display section 129 and periphery thereof.

In settlement terminal device 100 of the modification example of the first exemplary embodiment, an area where non-secure display area 27A and secure display area 27B (see FIG. 2A) are overlapped is not set, but the area where non-secure display area 27A and secure display area 27B are overlapped may be set. When the overlap area is set, touch input switching controller 117 turns on both of switches 114a and 114b in touch input switching/distributing section 114. As a result, the information on the touch input coordinates detected by first touch input detector 127 is input to both of first touch input processing section 107 in non-secure first information processing unit 21 and second touch input processing section 113 in secure second information processing unit 41.

Further, when the detection timing of first touch input detector 127 is associated with coordinates that do not belong to any one of non-secure input area 127A (see FIG. 2A) and secure input area 127B, touch input switching controller 117 turns off both of switches 114a and 114b in touch input switching/distributing section 114.

Display information to secure display area 129B (see FIG. 9A) is not falsified due to the control described with reference to FIGS. 4, 5A, and 5B. For example, a message for urging a signature ("Please, input signature"), signature input section 133A, and the like are displayed in secure display area 129B (see FIG. 12A) of first touch panel TP1 without being falsified. Further, even though an unauthorized signature input section, a message for urging a signature, or the like is output from non-secure first display generating section 109, this is not displayed in secure display area 129B. Even though an unauthorized signature input section is displayed in non-secure display area 129A, the operator of settlement terminal device 100 realizes that the unauthorized signature input section is not formal signature input section 133 displayed in secure display area 129B. Accordingly, the occurrence of unauthorized settlement processing is reduced.

Further, touch input switching controller 117 and touch input switching/distributing section 114 (see FIGS. 4 and 5B) in secure second information processing unit 41 do not undergo unauthorized access or unauthorized control from the outside. As a result, particularly, the information on the touch input coordinates to secure input area 127B (see FIG. 12A) is not wiretapped or falsified. For example, the input information such as a signature or the like which is touch-input to secure input area 127B (see FIG. 12) is input to second touch input processing section 113 without being wiretapped or falsified, and thus, the occurrence of unauthorized settlement proceeding is reduced.

As described above, signature input section 133A of the modification example of the second exemplary embodiment is displayed in secure display area 129B of first touch panel TP1. That is, when displaying signature input section 133A in the secure display area, display switching/overlapping section 116 outputs image data generated by second display generating section 115 to first display section 129 according to a switching/overlapping instruction from display switching controller 118.

Further, touch input switching/distributing section 114 outputs coordinate data of the touch input detected in secure input area 127B of first touch input detector 127 to second touch input processing section 113 according to a switching/distribution instruction from touch input switching controller 117.

Accordingly, the operator knows that secure input area 127B (range of coordinates where secure input can be performed) of first touch panel TP1 is set inside secure display area 129B (range of coordinates where secure display can be performed), and thus, can safely sign a signature to secure input area 127B through signature input section 133 according to the message displayed in secure display area 129B.

Accordingly, the input of the authentication information (for example, signature) of the card used for settlement and the display of the input are performed by second touch input processing section 113 and second display generating section 115 in second information processing unit 41. Accordingly, the operator inputs the PIN using formal signature input section 133A displayed in secure display area 129B (see FIG. 9A) by the touch input to secure input area 127B (see FIG. 12A), and thus, the occurrence of unauthorized settlement processing is reduced.

As described above, various embodiments have been described with reference to the accompanying drawings, but the invention is not limited thereto. It is obvious to those skilled in the art that various modifications or revisions can be made within the categories disclosed in claims, which should be construed to be included in the technical scope of the invention.

For example, the positions and ranges (ranges of coordinates where display and input can be performed) of the non-secure display area, the secure display area, the non-secure input area, and the secure input area in the above-described exemplary embodiments are respectively exemplary, and may be set in an arbitrary manner. Further, these positions and ranges may be set according to the content of processing to be performed by the settlement terminal device, that is, for each application executed by the settlement terminal device, so that display and input suitable for each application can be performed.

In addition, in the above-described embodiments, the input detector and the display section are configured by the touch panel in which the detection surface is overlapped with the screen, but may be configured by two units in which the detection surface and the screen are disposed not to be overlapped, that is, to be spaced from each other.

What is claimed is:

1. An information processing device that performs processing, comprising:
   a single display includes a secure display area configured to display first information for an authentication with respect to settlement processing and a non-secure display area configured to display second information with respect to work processing which includes at least one of amount information with respect to the settlement processing, a payment method with respect to the settlement processing, a message instructing a reading operation of a card used for the settlement processing and information with respect to work of a member store; and;
   a single input detector that detects an input operation with respect to a predetermined input detection surface overlapped with the single display, the input operation being input authentication information with respect to the settlement processing, wherein
   the input detection surface includes a secure input area having tamper resistance against the input authentication information and a non-secure input area not having tamper resistance against the input authentication information, wherein
   at least a part of the secure display area of the single display is not overlapped with the secure input area of the input detection surface, and
   wherein at least one of coordinates on the single display corresponding to the secure display area and coordinates on the input detection surface corresponding to the secure input area is changed according to content of processing to be executed.

2. The information processing device of claim 1, further comprising:
   an area setting controller that sets the secure display area which is the secure area and the non-secure display area on the single display, and sets the secure input area which is the secure area and a non-secure input area on the input detection surface.

3. The information processing device of claim 2, further comprising:
   a display controller that displays information in the secure display area or the non-secure display area according to content of processing to be executed,
   wherein the single input detector processes an input detected in the secure input area or the non-secure input area according to content of processing to be executed.

4. The information processing device of claim 1,
   wherein the single input detector and the single display are configured by a touch panel.

5. The information processing device of claim 2,
   wherein the area setting controller sets the secure display area and the non-secure display area on the single display so that parts of the secure display area and the non-secure display area are overlapped.

6. The information processing device of claim 4,
   wherein the single input detector and the single display are configured by the touch panel.

7. The information processing device of claim 3,
   wherein the display controller displays information for urging an operation with respect to the secure input area as the information to be displayed in the secure display area.

8. The information processing device of claim 4,
   wherein the touch panel includes
   a first touch panel where a secure input area is not set on the input detection surface, and
   a second touch panel where the secure input area is set on the input detection surface.

9. An information processing device that performs processing, comprising:
   a first display that includes a secure display area configured to display first information for an authentication with respect to settlement processing and a non-secure display area configured to display second information with respect to work processing which includes at least one of amount information with respect to the settlement processing, a payment method with respect to the settlement processing, a message for instructing a reading operation of a card used for the settlement processing and information with respect to work of a member store; and
   a first input detector that detects a first input operation with respect to a first input detection surface overlapped with the first display, the first input detection surface including a non-secure input area not having tamper resistance; and
   a second input detector that detects a second input operation with respect to a second input detection surface not overlapped with the first display, the second input detection surface including a secure input area having tamper resistance against input authentication information, wherein
   at least a part of the secure display area of the first display is not overlapped with the secure input area of the second input detection surface,
   wherein at least one of coordinates on the first display corresponding to the secure display area is changed according to content of processing to be executed.

10. The information processing device of claim 9, further comprising a second display that is overlapped with the second input detection surface.

* * * * *